US011028014B2

(12) United States Patent
Harris et al.

(10) Patent No.: US 11,028,014 B2
(45) Date of Patent: Jun. 8, 2021

(54) COATED GLASS-BASED ARTICLES WITH ENGINEERED STRESS PROFILES

(71) Applicant: CORNING INCORPORATED, Corning, NY (US)

(72) Inventors: Jason Thomas Harris, Horseheads, NY (US); Guangli Hu, Berkeley Heights, NJ (US)

(73) Assignee: Corning Incorporated, Corning, NY (US)

( * ) Notice: Subject to any disclaimer, the term of this patent is extended or adjusted under 35 U.S.C. 154(b) by 15 days.

(21) Appl. No.: 16/482,035

(22) PCT Filed: Jan. 31, 2018

(86) PCT No.: PCT/US2018/016163
§ 371 (c)(1),
(2) Date: Jul. 30, 2019

(87) PCT Pub. No.: WO2018/144554
PCT Pub. Date: Aug. 9, 2018

(65) Prior Publication Data
US 2019/0352226 A1  Nov. 21, 2019

Related U.S. Application Data

(60) Provisional application No. 62/452,583, filed on Jan. 31, 2017.

(51) Int. Cl.
*B32B 17/06* (2006.01)
*B32B 15/04* (2006.01)
(Continued)

(52) U.S. Cl.
CPC ............ *C03C 21/002* (2013.01); *C03C 17/06* (2013.01); *C03C 17/22* (2013.01); *C03C 17/225* (2013.01);
(Continued)

(58) Field of Classification Search
CPC .................................................... C03C 21/002
(Continued)

(56) References Cited

U.S. PATENT DOCUMENTS 3,287,201 A  11/1966  Chisholm et al.
8,083,362 B2  12/2011  Finot et al.
(Continued)

FOREIGN PATENT DOCUMENTS

CN   202784250 U   3/2013
CN   105980323 A   9/2016
(Continued)

OTHER PUBLICATIONS

International Search Report and Written Opinion of the International Searching Authority; PCT/US2018/016163; dated April 3, 2018; 11 Pages; European Patent Office.
(Continued)

*Primary Examiner* — Lauren R Colgan
(74) *Attorney, Agent, or Firm* — Jeffrey A. Schmidt

(57) ABSTRACT

A glass-based substrate having a Young's modulus, a first surface, and a second surface. A coating, on at least one of the first and second surfaces, having a Young's modulus equal to or greater than the substrate Young's modulus. A compressive region having a compressive stress CS of from 750 MPa to 1200 MPa at a surface and extending to a depth of compression (DOC). The compressive region having a first portion and a second portion, the first portion extending from the first surface up to a first depth, the second portion extending from the first depth to the DOC, points in the first portion comprise a tangent having a slope that is less than −15 MPa/micrometers and greater than −60 MPa/micrometers, and points in the second portion comprise a tangent having a slope that is less than or equal to −1 MPa/micrometers and greater than −12 MPa/micrometers.

18 Claims, 12 Drawing Sheets

(51) Int. Cl.
*C03C 21/00* (2006.01)
*C03C 17/06* (2006.01)
*C03C 17/22* (2006.01)
*C03C 17/23* (2006.01)
*H05K 5/00* (2006.01)

(52) U.S. Cl.
CPC ........... *C03C 17/23* (2013.01); *H05K 5/0017* (2013.01); *C03C 2217/214* (2013.01); *C03C 2217/22* (2013.01); *C03C 2217/228* (2013.01); *C03C 2217/281* (2013.01); *C03C 2217/282* (2013.01); *C03C 2217/78* (2013.01)

(58) Field of Classification Search
USPC ................................ 428/426, 428, 409, 410
See application file for complete search history.

(56) References Cited

U.S. PATENT DOCUMENTS

| | | | |
|---|---|---|---|
| 8,187,987 B2 * | 5/2012 | Amin | C03C 3/087 |
| | | | 501/69 |
| 8,312,739 B2 | 11/2012 | Lee et al. | |
| 8,385,705 B2 | 2/2013 | Overton et al. | |
| 8,561,429 B2 | 10/2013 | Allan et al. | |
| 8,586,492 B2 * | 11/2013 | Barefoot | C03C 21/002 |
| | | | 501/66 |
| 9,156,724 B2 | 10/2015 | Gross | |
| 9,487,434 B2 * | 11/2016 | Amin | C03C 21/002 |
| 9,586,858 B2 | 3/2017 | Bellman et al. | |
| 9,776,913 B2 * | 10/2017 | Gao | C03C 17/23 |
| 9,992,891 B2 | 6/2018 | Pakula et al. | |
| 10,150,698 B2 * | 12/2018 | Amin | C03C 21/002 |
| 10,160,688 B2 * | 12/2018 | Amin | C03C 17/3435 |
| 10,730,790 B2 * | 8/2020 | Paulson | H05K 5/0017 |
| 2007/0211344 A1 | 9/2007 | Setoguchi | |
| 2011/0187245 A1 | 8/2011 | Pakula et al. | |
| 2012/0052271 A1 * | 3/2012 | Gomez | C03C 3/091 |
| | | | 428/213 |
| 2012/0052302 A1 | 3/2012 | Matusick et al. | |
| 2013/0069502 A1 | 3/2013 | Hu et al. | |
| 2013/0122284 A1 | 5/2013 | Gross | |
| 2013/0224492 A1 * | 8/2013 | Bookbinder | C03C 23/007 |
| | | | 428/410 |
| 2014/0090864 A1 | 4/2014 | Paulson | |
| 2014/0106146 A1 | 4/2014 | Decker et al. | |
| 2014/0106150 A1 | 4/2014 | Decker et al. | |
| 2014/0131091 A1 * | 5/2014 | Smith | C03C 17/23 |
| | | | 174/565 |
| 2014/0370302 A1 * | 12/2014 | Amin | A01N 59/16 |
| | | | 428/426 |
| 2015/0030834 A1 * | 1/2015 | Morey | G01N 3/30 |
| | | | 428/220 |
| 2015/0037554 A1 * | 2/2015 | Gao | C03C 17/22 |
| | | | 428/217 |
| 2015/0079398 A1 * | 3/2015 | Amin | C03C 17/225 |
| | | | 428/408 |
| 2015/0111016 A1 | 4/2015 | Fisher et al. | |
| 2015/0239775 A1 * | 8/2015 | Amin | C03C 3/091 |
| | | | 428/220 |
| 2015/0259244 A1 * | 9/2015 | Amin | C03C 3/091 |
| | | | 428/410 |
| 2015/0368153 A1 * | 12/2015 | Pesansky | C03C 3/097 |
| | | | 428/220 |
| 2016/0122239 A1 | 5/2016 | Amin et al. | |
| 2016/0214889 A1 * | 7/2016 | Garner | C03C 3/083 |
| 2016/0257605 A1 * | 9/2016 | Amin | C03C 3/095 |
| 2016/0264452 A1 * | 9/2016 | Amin | C03C 3/04 |
| 2017/0036953 A1 * | 2/2017 | Amin | C03C 21/00 |
| 2017/0129803 A1 * | 5/2017 | Amin | C03C 3/085 |
| 2019/0039946 A1 | 2/2019 | Bayne et al. | |

FOREIGN PATENT DOCUMENTS

| | | |
|---|---|---|
| JP | 2015-535804 A | 12/2015 |
| JP | 2016-533316 A | 10/2016 |
| JP | 6013597 B2 | 10/2016 |
| WO | 2011/119414 A1 | 9/2011 |
| WO | 2016/065089 A2 | 4/2016 |

OTHER PUBLICATIONS

Hay et al; "Continuous Stiffness Measurement During Instrumented Indentation Testing"; Expreimental Techniques; (2010) pp. 86-94.
Fischer-Cripps; "Cricical Review of Analysis and Interpretation of Nanoindentation Test Data"; Surface & Coatings Technology; 200, 4153 4165 (2006).
Japanese Patent Application No. 2019-562231 Notice of Reasons for Refusal dated Dec. 2, 2020; 10 Pages; (5 Pages of English Translation and 5 Pages of Original Document) Japanese Patent Office.
Taiwanese Patent Application No. 107102895, Office Action dated Mar. 19, 2021, 3 pages (English Translation Only); Taiwanese Patent Office.
European Patent Application No. 18704783.2, Office Action dated Feb. 24, 2021; 5 pages; European Patent Office.

* cited by examiner

COATED GLASS-BASED ARTICLES WITH ENGINEERED STRESS PROFILES

CROSS-REFERENCE TO RELATED APPLICATIONS

This application is a national stage entry of International Patent Application Serial No. PCT/US2018/016163, filed on Jan. 31, 2018, which in turn, claims the benefit of priority under 35 U.S.C. § 119 of U.S. Provisional Application Ser. No. 62/452,583 filed on Jan. 31, 2017, the contents of each of which are relied upon and incorporated herein by reference in their entireties.

FIELD

Embodiments of the disclosure generally relate to coated glass-based articles having engineered stress profiles and methods for manufacturing the same.

BACKGROUND

Strengthened glass-based articles are widely used in electronic devices as cover plates or windows for portable or mobile electronic communication and entertainment devices, such as mobile phones, smart phones, tablets, video players, information terminal (IT) devices, laptop computers, wearables (e.g. watches), navigation systems and the like, as well as in other applications such as architecture (e.g., windows, shower panels, countertops etc.), transportation (e.g., automotive, trains, aircraft, sea craft, etc.), appliance, or any application that may benefit from superior fracture resistance but thin and light-weight articles.

In strengthened glass-based articles, such as chemically strengthened glass articles, compressive stress typically is highest or at a peak at the glass surface and reduces from a peak value moving away from the surface, and there is zero stress at some interior location of the glass article before the stress in the glass article becomes tensile. The point at which stress is neutral is called the depth of compression (DOC). Modifications to ion exchange processes can be used to address sensitivity to initial flaw populations in strengthened glass-based articles to modify the stress profile of the glass to decrease sensitivity to initial flaw populations. While modifications to ion exchange processes can be used for this purpose, it would be desirable to develop other methods to provide strengthened glass-based materials having improved reliability, while not significantly impacting mean strength of the strengthened glass-based materials. Hard, brittle coatings on the surface of glass-based articles have been utilized to provide scratch resistance to glass based articles, however, for strengthened glass-based articles having steep stress profiles, hard coatings can have a tendency to deteriorate flexural strength performance of the strengthened glass-based articles.

SUMMARY

A first aspect of the disclosure pertains to a coated glass-based article comprising a glass-based substrate having a substrate Young's modulus value and a first surface and a second surface opposing the first surface defining a substrate thickness (t) in a range of from 0.1 millimeters to 3 millimeters; a coating on at least one of the first surface and the second surface of the glass-based substrate having a coating Young's modulus value equal to or greater than the substrate Young's modulus value and a coating thickness ($t_c$) in a range of from 80 nanometers to 10 micrometers; and the glass-based substrate having a compressive region having a compressive stress CS of from 750 MPa to 1200 MPa at a surface of the glass-based article, the CS extending through the compressive region and decreasing to zero at a depth of compression (DOC), the compressive region having a stress profile including a first portion and a second portion, the first portion extending from the first surface up to a first depth, the second portion extending from the first depth to the DOC, points in the first portion comprise a tangent having a slope that is less than −15 MPa/micrometers and greater than −60 MPa/micrometers, and points in the second portion comprise a tangent having a slope that is less than or equal to −1 MPa/micrometers and greater than −12 MPa/micrometers. When the thickness (t) is less than 300 microns, the first depth is up to 0.1·t, for example about 0.1·t, about 0.09·t, about 0.08·t, about 0.07·t, about 0.06·t, or about 0.05·t. When the thickness (t) is 300 microns or more, the first depth is from about 10 microns to about 30 microns, for example, about 10 microns, about 12 microns, about 14 microns, about 15 microns, about 16 microns, about 18 microns, about 20 microns, about 22 microns, about 24 microns about 25 microns, about 26 microns, about 28 microns, or about 30 microns, or about 12 microns to about 30 microns, or about 14 microns to about 30 microns, or about 16 microns to about 30 microns, or about 18 microns to about 30 microns, or about 20 microns to about 30 microns, or about 25 microns to about 30 microns, or about 12 to about 28 microns, or about 14 to about 26 microns, or about 16 to about 24 microns, or about 18 to about 22 microns. Young's modulus values disclosed herein for the substrate were measured by Resonant Ultrasound Spectroscopy technique of the general type set forth in ASTM E2001-13, titled "Standard Guide for Resonant Ultrasound Spectroscopy for Defect Detection in Both Metallic and Non-metallic Parts", whereas Young's modulus values disclosed herein for the coating were measured by known nanoindentation methods.

To measure the Young's modulus of the thin film elements (coating) a proxy layer was used. The proxy layer was made of the same material and was deposited by the same process used to generate the coating, but was deposited 300 nm thick onto a Gorilla® Glass substrate. Hardness and Young's modulus of thin film coatings are determined using widely accepted nanoindentation practices. See: Fischer-Cripps, A. C., Critical Review of Analysis and Interpretation of Nanoindentation Test Data, Surface & Coatings Technology, 200, 4153-4165 (2006) (hereinafter "Fischer-Cripps"); and Hay, J., Agee, P, and Herbert, E., Continuous Stiffness measurement During Instrumented Indentation Testing, Experimental Techniques, 34 (3) 86-94 (2010) (hereinafter "Hay"). For coatings, it is typical to measure hardness and modulus as a function of indentation depth. So long as the coating is of sufficient thickness, it is then possible to isolate the properties of the coating from the resulting response profiles. It should be recognized that if the coatings are too thin (for example, less than ~500 nm), it may not be possible to completely isolate the coating properties as they can be influenced from the proximity of the substrate which may have different mechanical properties. See Hay. The methods used to report the properties herein are representative of the coatings themselves. The process is to measure hardness and modulus versus indentation depth out to depths approaching 1000 nm. In the case of hard coatings on a softer glass, the response curves will reveal maximum levels of hardness and modulus at relatively small indentation depths (</=about 200 nm). At deeper indentation depths both hardness and modulus will gradual diminish as the response is influenced by the softer glass substrate. In this case the coating hardness and modulus are taken be those associated with the regions exhibiting the maximum hardness and modulus. In the case of soft coatings on a harder glass substrate, the coating properties will be indicated by lowest hardness and modulus levels that occur at relatively small indentation depths. At deeper indentation depths, the hardness and modulus will gradually increase due to the influence of the harder glass. These profiles of hardness and modulus versus depth can be obtained using either the traditional Oliver and Pharr approach (as described in Fischer-Cripps) or by the more efficient continuous stiffness approach (see Hay). Extraction of reliable nanoindentation data is based on well-established protocols being followed. Otherwise, these metrics can be subject to significant errors. These elastic modulus and hardness values are measured for such thin films using known diamond nano-indentation methods, as described above, with a Berkovich diamond indenter tip.

Another aspect of the disclosure pertains to a coated glass-based article comprising a glass-based substrate having a substrate Young's modulus value and a first surface and a second surface opposing the first surface defining a substrate thickness (t) in a range of from 0.1 millimeters to 3 millimeters; a coating on at least one of the first surface and the second surface of the glass-based substrate having a coating Young's modulus value equal to or greater than the substrate Young's modulus value and a coating thickness ($t_c$) in a range of from 80 nanometers to 10 microns; and the glass-based substrate having a compressive region having a compressive stress CS of 750 MPa or more at a first surface of the glass-based article, the CS extending through the compressive region and decreasing to zero at a depth of compression (DOC), the compressive region having a stress profile including a first portion and a second portion, the first portion extending from the first surface up to a first depth, the second portion extending from the first depth to the DOC such that the CS at a depth of 10 micrometers from the first surface is 30% to 50% of the CS at the first surface and points of the stress profile of the first portion comprise a first portion tangent and points of the stress profile of the second portion comprise a second portion tangent, wherein a ratio of the slope of the first portion tangent to the slope of the second portion tangent is from 1.25 to 60. When thickness (t) is less than 300 microns, the first depth is up to 0.1·t, for example about 0.1·t, about 0.09·t, about 0.08·t, about 0.07·t, about 0.06·t, or about 0.05·t. When thickness (t) is 300 microns or more, the first depth is from about 10 microns to about 30 microns, for example, about 10 microns, about 12 microns, about 14 microns, about 15 microns, about 16 microns, about 18 microns, about 20 microns, about 22 microns, about 24 microns about 25 microns, about 26 microns, about 28 microns, or about 30 microns, or about 12 microns to about 30 microns, or about 14 microns to about 30 microns, or about 16 microns to about 30 microns, or about 18 microns to about 30 microns, or about 20 microns to about 30 microns, or about 25 microns to about 30 microns, or about 12 to about 28 microns, or about 14 to about 26 microns, or about 16 to about 24 microns, or about 18 to about 22 microns.

The glass-based articles described herein can be selected from an architectural glass substrate, a vehicle glazing, a vehicle interior glass substrate, an appliance glass substrate, a handheld device glass substrate, a wearable device glass substrate (e.g. for watches, smart watches, displays integrated into clothing or other wearable articles), and a flexible display substrate.

BRIEF DESCRIPTION OF THE DRAWINGS

The accompanying figures, which are incorporated in and constitute a part of this specification, illustrate several embodiments described below.

DETAILED DESCRIPTION

Figure 1:
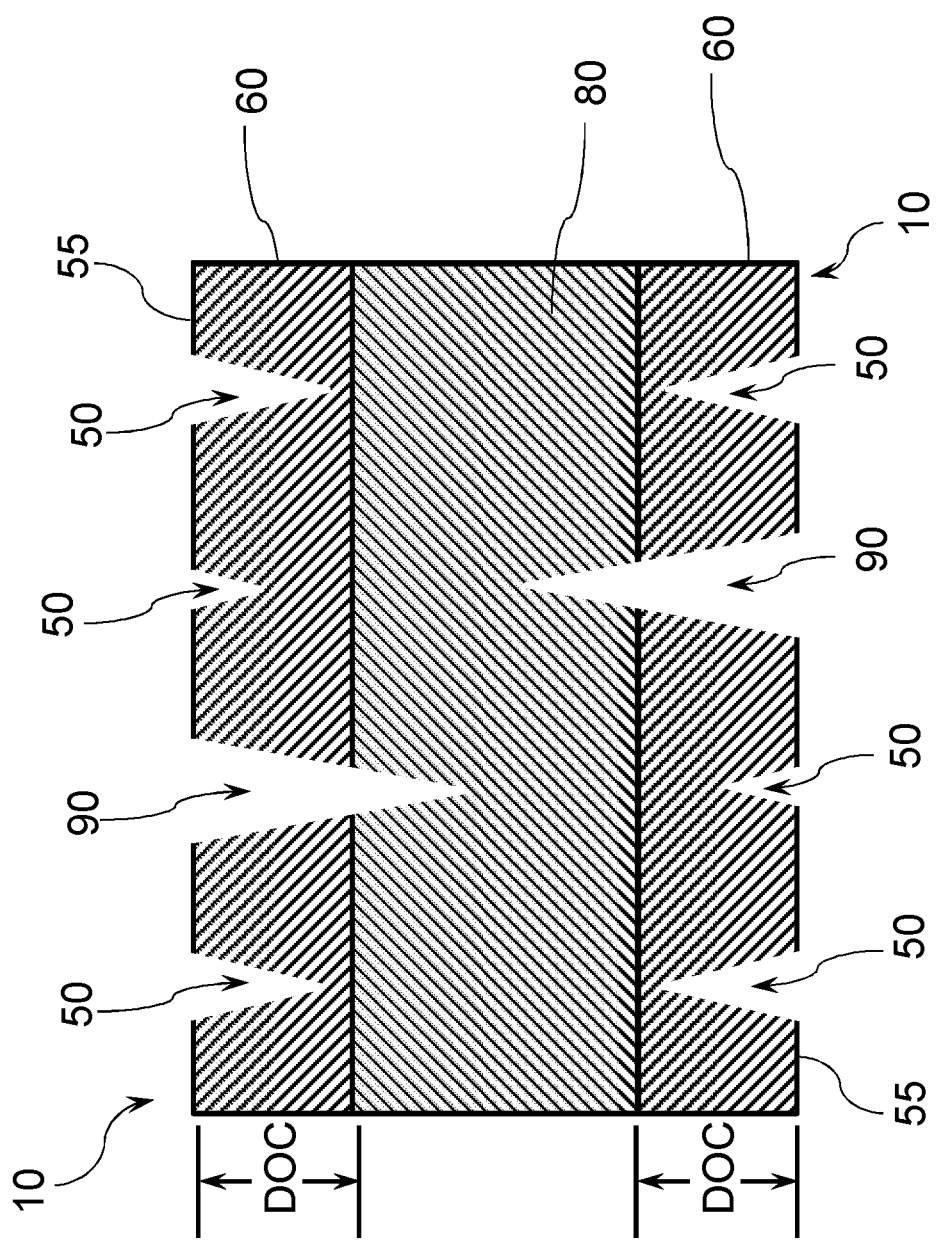
FIG. 1 illustrates a glass-based substrate with a surface having a plurality of cracks, according to some embodiments.

Before describing several exemplary embodiments, it is to be understood that the disclosure is not limited to the details of construction or process steps set forth herein. The disclosure provided herein is capable of other embodiments and of being practiced or being carried out in various ways.

Reference throughout this specification to "one embodiment," "certain embodiments," "various embodiments," "one or more embodiments", "some embodiments" or "an embodiment" means that a particular feature, structure, material, or characteristic described in connection with the embodiment is included in at least one embodiment of the disclosure, and may be included in any other embodiments of the disclosure in any and all combinations. Thus, the appearances of the phrases such as "in one or more embodiments," "in certain embodiments," "in various embodiments," "in one embodiment", "in some embodiments" or "in an embodiment" in various places throughout this specification are not necessarily referring to the same embodiment.

Directional terms as used herein—for example up, down, right, left, front, back, top, bottom—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

One or more embodiments of the disclosure provide glass-based articles including a glass-based substrate having an engineered stress profile and a coating on the glass-based substrate. Throughout the specification the term "glass-based" substrate or article should be understood to be a "strengthened" glass-based substrate or article when the article or substrate is described as having stress or a stress profile. In one or more embodiments, the coating comprises material with the same or higher Young's modulus than the glass-based substrate applied on one or both sides of the glass-based substrate. According to one or more embodiments, the coating has no residual stress or has a compressive residual stress. In one or more embodiments, the coating has a tensile stress. For the case where the coating has no residual stress, a stress profile is provided that is similar to a stress profile that is obtained by shifting an ion-exchange profile by a certain distance into the glass-based article, with the outer region of the glass-based article having no compressive stress. This configuration according to modeling and preliminary experimental data will be less sensitive to initial glass flaws compared to the original chemically glass-based substrate while having the same mean strength. Coatings can include multi-layer coatings. The glass-based substrates can be planar, or they can be curved in one or more directions (e.g., x, y and/or z planes) to provide a three-dimensional substrate. The glass-based substrates can be cold-formed. In one or more embodiments, the substrates are curved in at least one direction (e.g., x, y and/or z planes). In one or more embodiments, the glass-based substrates can have 2.5-dimensionality, for example, by having beveled edges. The stress profile of the glass-based substrates can be symmetrical (the same on opposite sides of a glass substrate) or asymmetrical (stress profile on one side of the substrate is different from the stress profile on the opposite side of the substrate.

According to one or more embodiments, glass-based articles are provided. In one or more embodiments, glass-based articles include a coating to protect the glass-based article from damage, such as sharp contact induced fracture and surface scratches. In one or more embodiments, coatings may be applied for other functions such as for a capacitive touch sensor, or other optical qualities. High stiffness coatings, namely, coatings having a relatively high Young's modulus that tend to be brittle have resulted in a need for glass based articles with stress profiles to mitigate strength reduction associated with the high stiffness, brittle coatings. In one or more embodiments glass based articles are provided that include designed stress profiles that provide resistance to failure due to deep damage. The flexural strength (measured using a test such as ring-on-ring) of glass based articles with high stiffness, brittle coatings is function of the maximum surface stress, and the shape of the stress profile between the coating/glass interface and a depth of from 10 micrometers to 30 micrometers from the substrate surface (then the article thickness is 300 microns or more), and a depth of up to about 0.1·t when the article is less than 300 microns thick), depending on the shape of the profile is of interest. According to one or more embodiments, coated glass-based articles have a stress profile that exhibits improved flexural strength of the coated glass-based article, and/or deep damage introduction resistance for composite product.

In some embodiments, the proposed stress profiles can be achieved through modified ion exchange processes, for example, two or more ion exchange processes or a combination of two or more different strengthening mechanisms, e.g., lamination strengthening due to CTE mismatch, ion exchange (chemical tempering), or thermal tempering. Embodiments of glass based articles are generally from 0.1 mm to 2 mm thick, and the brittle coating is generally from 10 nanometers to 10 micrometers thick. According to one or more embodiments, coated glass-based article stress profiles can be tuned to improve flexural strength, deep damage resistance, or both. In some embodiments to achieve good smooth surface drop performance, it is beneficial to have a high compressive stress (CS) at the glass surface, and a low slope for the stress profile within a first depth from the surface. In some embodiments, to achieve good rough surface drop performance, it is beneficial to have a deep DOC. In order to achieve both a high CS at the glass surface, and a deep DOC, it is beneficial for the stress profile to have two portions, a first portion extending from the glass surface to a first depth, and a second portion extending from the first depth to the DOC. In order to achieve both good smooth surface drop and good rough surface drop, it is beneficial for the first portion of the stress profile to have a low slope, and the second portion of the stress profile to have an even lower slope so as to achieve a deep DOC, accordingly, the slope of the stress profile in the second portion is lower than that in the first portion. When the glass-based substrate thickness (t) is less than 300 microns, the first depth is up to 0.1·t, for example about 0.1·t, about 0.09·t, about 0.08·t, about 0.07·t, about 0.06·t, or about 0.05·t, and when the glass-based substrate thickness is 300 microns or more, the first depth is from about 10 microns to about 30 microns, for example, about 10 microns, about 12 microns, about 14 microns, about 15 microns, about 16 microns, about 18 microns, about 20 microns, about 22 microns, about 24 microns about 25 microns, about 26 microns, about 28 microns, or about 30 microns, or about 12 microns to about 30 microns, or about 14 microns to about 30 microns, or about 16 microns to about 30 microns, or about 18 microns to about 30 microns, or about 20 microns to about 30 microns, or about 25 microns to about 30 microns, or about 12 to about 28 microns, or about 14 to about 26 microns, or about 16 to about 24 microns, or about 18 to about 22 microns. In certain embodiments, because smooth surface drop failure is controlled by flexural strength, improved resistance to coating flaw propagation will also improve smooth surface drop performance. Coated glass-based articles with an engineered stress profile and a brittle functional coating are expected to exhibit better performance compared to standard ion-exchanged glass-based articles or deep DOC glass-based articles with the same coating.

FIG. 1 illustrates an exemplary strengthened glass-based substrate 10 having a CS region 60, a CT region 80 (which is a region under tensile stress or tension), and a plurality of cracks. Compressive stress regions 60, extending from outer surfaces 55 of the glass-based substrate 10 to a DOC, and are under a compressive stress (CS). Cracks 50 in the compressive stress region 60 of the exemplary strengthened glass-based substrate 10 that do not extend into the central tension region 80 of the glass are shown, along with cracks 90 that penetrate into the central tension regions 80 of the glass. Although the incorporation of a CS in a near surface region of the glass can inhibit crack propagation and failure of the glass-based substrate, if the damage extends beyond the DOC, and if the CT is of a high enough magnitude, the flaw will propagate over time until it reaches the material's critical stress intensity level (fracture toughness) and will ultimately fracture the glass.

Figure 2:
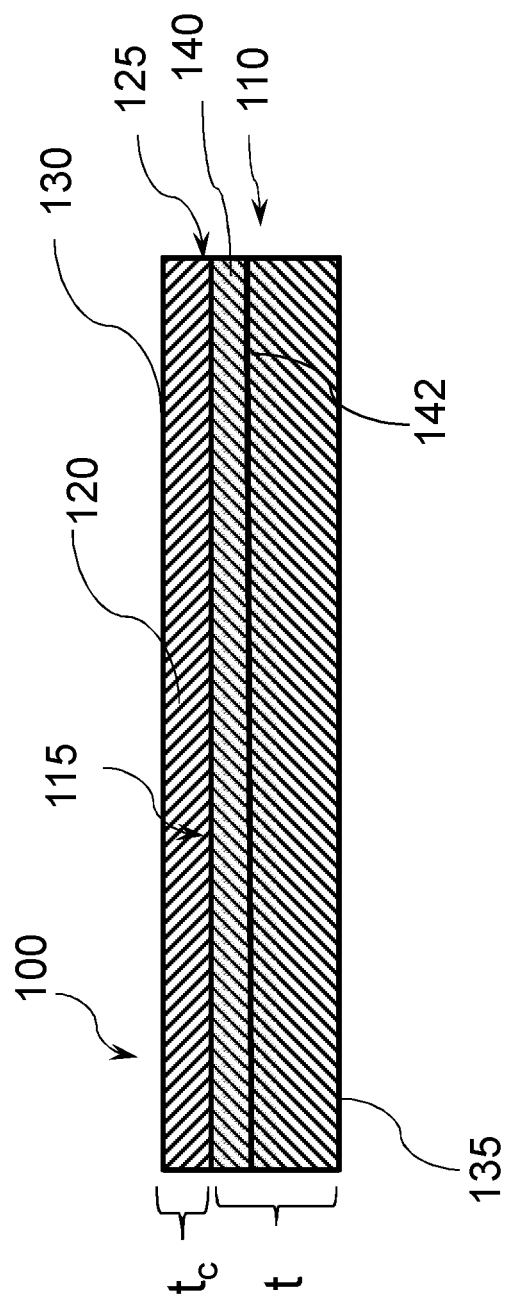
FIG. 2 illustrates a glass-based substrate having a coating on one side, according to some embodiments.

Referring now to FIG. 2, according to some embodiments of the disclosure a coated glass-based article 100, for example, a glass-based article comprising a glass-based substrate 110 having a first surface 115 having first coating 120 thereon defining a first interface 125 between the first coating 120 and the glass-based substrate 110 and a second surface 135 opposite first surface 115, the first coating 120 having a first coating thickness ($t_c$) extending from a first coating surface 130 to the first surface 115, and the glass-based substrate 110 having a substrate thickness (t) extending from the first surface 115 to a second surface 135. The glass-based substrate 110 has a substrate Young's modulus value, and has a thickness of from 0.1 millimeters to 3 millimeters. The first coating 120, which can be on the first surface 115 or the second surface 135 of the substrate 110 has a coating thickness ($t_c$) in a range of from 80 nanometers to 10 micrometers. The glass-based substrate 110 has a compressive stress region 140 extending from the first surface 115 to a DOC at 142. The compressive stress region 140 has a compressive stress CS of from 750 MPa to 1200 MPa at a surface 115 of the glass-based substrate, and the CS decreases through the compressive stress region 140 to zero at the DOC. The compressive region has a stress profile including a first portion extending from the first surface up to a first depth, and a second portion extending from the first depth to the DOC, points in the first portion comprise a tangent having a slope that is less than −15 MPa/micrometers and greater than −60 MPa/micrometers, and points in the second portion comprise a tangent having a slope that is less than or equal to −1 MPa/micrometers and greater than −12 MPa/micrometers. When thickness (t) is less than 300 microns, the first depth is up to 0.1·t, for example about 0.1·t, about 0.09·t, about 0.08·t, about 0.07·t, about 0.06·t, or about 0.05·t. When thickness is 300 microns or more, the first depth is from about 10 microns to about 30 microns, for example, about 10 microns, about 12 microns, about 14 microns, about 15 microns, about 16 microns, about 18 microns, about 20 microns, about 22 microns, about 24 microns about 25 microns, about 26 microns, about 28 microns, or about 30 microns, or about 12 microns to about 30 microns, or about 14 microns to about 30 microns, or about 16 microns to about 30 microns, or about 18 microns to about 30 microns, or about 20 microns to about 30 microns, or about 25 microns to about 30 microns, or about 12 to about 28 microns, or about 14 to about 26 microns, or about 16 to about 24 microns, or about 18 to about 22 microns.

Figure 3:
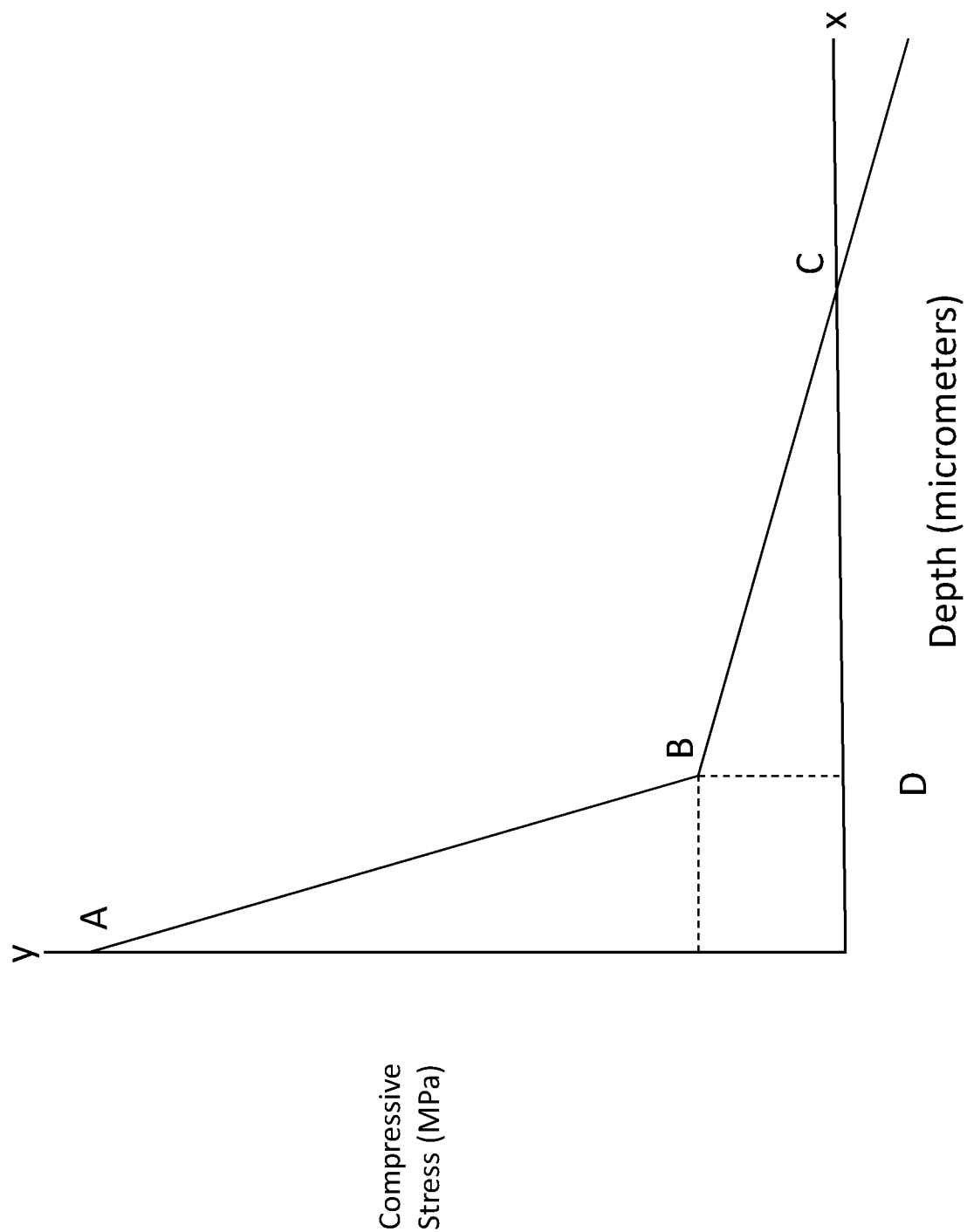
FIG. 3 illustrates a stress profile of a glass-based substrate including a coating.

FIG. 3 shows a stress profile for a glass-based substrate used to form coated glass-based articles according to some embodiments. As is understood in the art, glass-based articles, for example glass articles, can be manufactured to have a compressive stress at a surface of the glass article. FIG. 3 shows a graph of stress (y-axis) versus depth of the glass-based article from the surface. At point A where the stress profile intersects with the y-axis (i.e., at the surface of the glass-based substrate), the compressive stress of the glass-based article is at a maximum value and is from 750 MPa to 1200 MPa. The CS region extends to a DOC within the thickness of the glass where the stress is neutral, i.e., neither compressive nor tensile, i.e., point C. Between the surface (at point A) and the DOC (at point C), the stress profile extends through various compressive regions. The stress profile has a first portion, between points A and B on FIG. 1, that comprises a tangent having a slope that is from −60 MPa/micrometers to −15 MPa/micrometers. In some embodiments, point B is at a depth D (as shown in FIG. 3) of up to about 30 micrometers from the glass-based substrate surface, for example up to about 25 microns, or up to about 20 microns, or up to about 15 microns, or up to about 10 microns, or up to about 5 microns. When thickness (t) is less than 300 microns, the depth D is up to 0.1·t, for example about 0.1·t, about 0.09·t, about 0.08·t, about 0.07·t, about 0.06·t, or about 0.05·t. When thickness is 300 microns or more, the depth D is from about 10 microns to about 30 microns, for example, about 10 microns, about 12 microns, about 14 microns, about 15 microns, about 16 microns, about 18 microns, about 20 microns, about 22 microns, about 24 microns about 25 microns, about 26 microns, about 28 microns, or about 30 microns, or about 12 microns to about 30 microns, or about 14 microns to about 30 microns, or about 16 microns to about 30 microns, or about 18 microns to about 30 microns, or about 20 microns to about 30 microns, or about 25 microns to about 30 microns, or about 12 to about 28 microns, or about 14 to about 26 microns, or about 16 to about 24 microns, or about 18 to about 22 microns. The stress profile shown in FIG. 3 includes a second portion, shown between points B and C, in which points comprise a tangent having a slope that is from −12 MPa/micrometers to −1 MPa/micrometers. The second portion (between points B and C) extends from depth D up to the DOC, which can be about 0.25·t, 0.2·t, or about 0.15·t, or about 0.1·t. As shown in FIG. 3, at point C, the stress profile transitions from a compressive stress to a tensile stress. The exemplary stress profile shown in FIG. 3 can include regions in addition to the ones shown, and only one half of a stress profile of a glass-based substrate is shown. In one or more embodiments, the stress profile of the glass-based substrate generally includes a second side that is a mirror image of the first side. However, according to some embodiments, the glass-based substrate can include a stress profile that includes a compressive stress profile only on a single side of the glass-based substrate. In some embodiments, the stress profile need not be the same on both sides of the glass-based substrate, or of the glass-based article, i.e., the stress profile can be asymmetrical wherein comparing both sides of the substrate and/or article whereby there are different stress profiles on each side of the substrate and/or article. In some embodiments, the first section of the profile between points A and B is controlled by properties of the coating, namely the coating Young's modulus and coating thickness.

In a second embodiment, the substrate thickness (t) is from 0.2 millimeters to 2 millimeters. In a third embodiment, the substrate thickness (t) is from 0.3 millimeters to 1 millimeter. In a fourth embodiment, the first through third embodiments can have a coating thickness ($t_c$) is from 1 micrometer to 10 micrometers.

In a fifth embodiment, the compressive region of the first through fourth embodiments has a compressive stress CS at the surface from 800 MPa up to 1150 MPa. In a sixth embodiment, points in the first portion of the first through fifth embodiments comprise a tangent having a slope that is less than −15 MPa/micrometers and that is greater than −45 MPa/micrometers. In a seventh embodiment, points in the second portion of the first through sixth embodiments comprise a tangent having a slope that is less than or equal to −3 MPa/micrometers and that is greater than −8 MPa/micrometers. In an eighth embodiment, the substrate Young's modulus value of the first through the seventh embodiments is from 60 GPa to 120 GPa and the coating Young's modulus value is from 70 GPa to 400 GPa. In a ninth embodiment, the coating Young's modulus value of the first through eighth embodiments is from 100 GPa to 300 GPa. In a tenth embodiment, the coating of the first through the ninth embodiments is a scratch resistant coating selected from $Al_2O_3$, Mn, $AlO_xN_y$, $Si_3N_4$, $SiO_xN_y$, $Si_uAl_vO_xN_y$, diamond, diamond-like carbon, $Si_xC_y$, $Si_xO_yC_z$, $ZrO_2$, $TiO_xN_y$ and combinations thereof.

An eleventh embodiment pertains to a coated glass-based article of the type shown in FIG. 2, comprising a glass-based substrate having a substrate Young's modulus value and a first surface and a second surface opposing the first surface defining a substrate thickness (t) of from 0.1 millimeters to 3 millimeters. The glass-based article of the eleventh embodiment further comprises a coating on at least one of the first surface and the second surface of the glass-based substrate, the coating having a coating Young's modulus value equal to or greater than the substrate Young's modulus value and having a coating thickness ($t_c$) in a range of from 80 nanometers to 10 microns. The glass-based article of the eleventh embodiment further includes the glass-based substrate having a compressive stress region having a compressive stress CS of 750 MPa or more at a first surface of the glass-based substrate, the compressive region having a stress profile including a first portion and a second portion, the first portion extending from the first surface up to a first depth, the second portion extending from the first depth to the DOC such that the CS at a depth of 10 micrometers from the first surface is 30% to 50% of the CS at the first surface, and points of the stress profile of the first portion comprise a first portion tangent and points of the stress profile of the second portion comprise a second portion tangent, wherein a ratio of the slope of the first portion tangent to the slope of the second portion tangent is from 1.25 to 60. When thickness (t) is less than 300 microns, the first depth is up to 0.1·t, for example about 0.1·t, about 0.09·t, about 0.08·t, about 0.07·t, about 0.06·t, or about 0.05·t. When thickness (t) is 300 microns or more, the first depth is from about 10 microns to about 30 microns, for example, about 10 microns, about 12 microns, about 14 microns, about 15 microns, about 16 microns, about 18 microns, about 20 microns, about 22 microns, about 24 microns about 25 microns, about 26 microns, about 28 microns, or about 30 microns, or about 12 microns to about 30 microns, or about 14 microns to about 30 microns, or about 16 microns to about 30 microns, or about 18 microns to about 30 microns, or about 20 microns to about 30 microns, or about 25 microns to about 30 microns, or about 12 to about 28 microns, or about 14 to about 26 microns, or about 16 to about 24 microns, or about 18 to about 22 microns.

In an twelfth embodiment, the ratio of the slope of the first portion tangent to the slope of the second portion tangent of the eleventh embodiment is from 3 to 20. In a thirteenth embodiment, the ratio of the slope of the first portion tangent to the slope of the second portion tangent of the eleventh embodiment is from 4 to 15. In a fourteenth embodiment, the substrate thickness (t) of the first through thirteenth embodiments is from 0.2 millimeters to 2 millimeters. In a fifteenth embodiment, the substrate thickness (t) of the first through thirteenth embodiments is from 0.3 millimeters to 1 millimeter.

In a sixteenth embodiment, the coating thickness ($t_c$) of the eleventh through the fifteenth embodiments is from 1 micrometer to 10 micrometers. In a seventeenth embodiment, the compressive stress region of the eleventh through the sixteenth embodiments has a compressive stress CS from 800 MPa to 150 MPa. In an eighteenth embodiment, the substrate Young's modulus value of the eleventh through the seventeenth embodiments is from 60 GPa to 80 GPa and the coating Young's modulus value is from 70 GPa to 400 GPa. In a nineteenth embodiment, the coating Young's modulus value of the eleventh through the eighteenth embodiments is from 100 GPa to 300 GPa. In a twentieth embodiment, the coating of the eleventh through the nineteenth embodiments is a scratch resistant coating selected from $Al_2O_3$, Mn, $AlO_xN_y$, $Si_3N_4$, $SiO_xN_y$, $Si_uAl_vO_xN_y$, diamond, diamond-like carbon, $Si_xC_y$, $Si_xO_yC_z$, $ZrO_2$, $TiO_xN_y$ and combinations thereof.

In a twenty first embodiment, the glass-based substrate of any of the first through twentieth embodiments further comprises a strengthened glass substrate selected from the group consisting of a laminated glass substrate, chemically strengthened glass substrate, a thermally strengthened glass substrate and a combination thereof. In a twenty-second embodiment, the glass-based substrate of any of the first through twentieth embodiments comprises an ion exchangeable alkali aluminosilicate glass composition. In a twenty-third embodiment, the alkali aluminosilicate glass of the twenty-second embodiment further comprises up to 10 mol % $Li_2O$.

In a twenty-fourth embodiment, the alkali aluminosilicate glass of the twenty-second embodiment further comprises 4 or more mol % $P_2O_5$ and from 0 mol % to 4 mol % $B_2O_3$, wherein $1.3<[(P_2O_5+R_2O)/M_2O_3]\le 2.3$, where $M_2O_3=Al_2O_3+B_2O_3$, and $R_2O$ is the sum of monovalent cation oxides present in the alkali aluminosilicate glass. In a twenty-fifth embodiment, the glass of the twenty-second embodiment consists essentially of from 40 mol % to 70 mol % $SiO_2$; from 11 mol % to 25 mol % $Al_2O_3$; from 4 mol % to 15 mol % $P_2O_5$; from 13 mol % to 25 mol % $Na_2O$; from 13 to 30 mol % $R_xO$, wherein $R_xO$ is the sum of the alkali metal oxides, alkaline earth metal oxides, and transition metal monoxides present in the glass; from 11 to 30 mol % $M_2O_3$, where $M_2O_3=Al_2O_3+B_2O_3$; from 0 mol % to 1 mol % $K_2O$; from 0 mol % to 4 mol % $B_2O_3$, and 3 mol % or less of one or more of $TiO_2$, MnO, $Nb_2O_5$, $MoO_3$, $Ta_2O_5$, $WO_3$, $ZrO_2$, $Y_2O_3$, $La_2O_3$, $HfO_2$, CdO, $SnO_2$, $Fe_2O_3$, $CeO_2$, $As_2O_3$, $Sb_2O_3$, Cl, and Br; and $1.3<[(P_2O_5+R_2O)/M_2O_3]\le 2.3$, where $R_2O$ is the sum of monovalent cation oxides present in the glass. In a twenty-sixth embodiment, the coated glass-based article of the twenty-fifth embodiment comprises glass that is substantially free of lithium. According to a twenty-seventh embodiment, the glass-based article of the first through twenty-sixth embodiments is selected from the group consisting of an architectural glass substrate, a vehicle glazing, a vehicle interior glass substrate, an appliance glass substrate, a handheld device glass substrate, and a wearable device glass substrate.

In a twenty-eighth embodiment, a consumer electronic product comprises: a housing having a front surface, a back surface and side surfaces; electrical components provided at least partially within the housing, the electrical components including at least a controller, a memory, and a display, the display being provided at or adjacent the front surface of the housing; and a cover glass disposed over the display, wherein at least one of a portion of the housing or the cover glass comprises the glass-based article of any of the first through twenty-sixth embodiments.

Figure 4A:
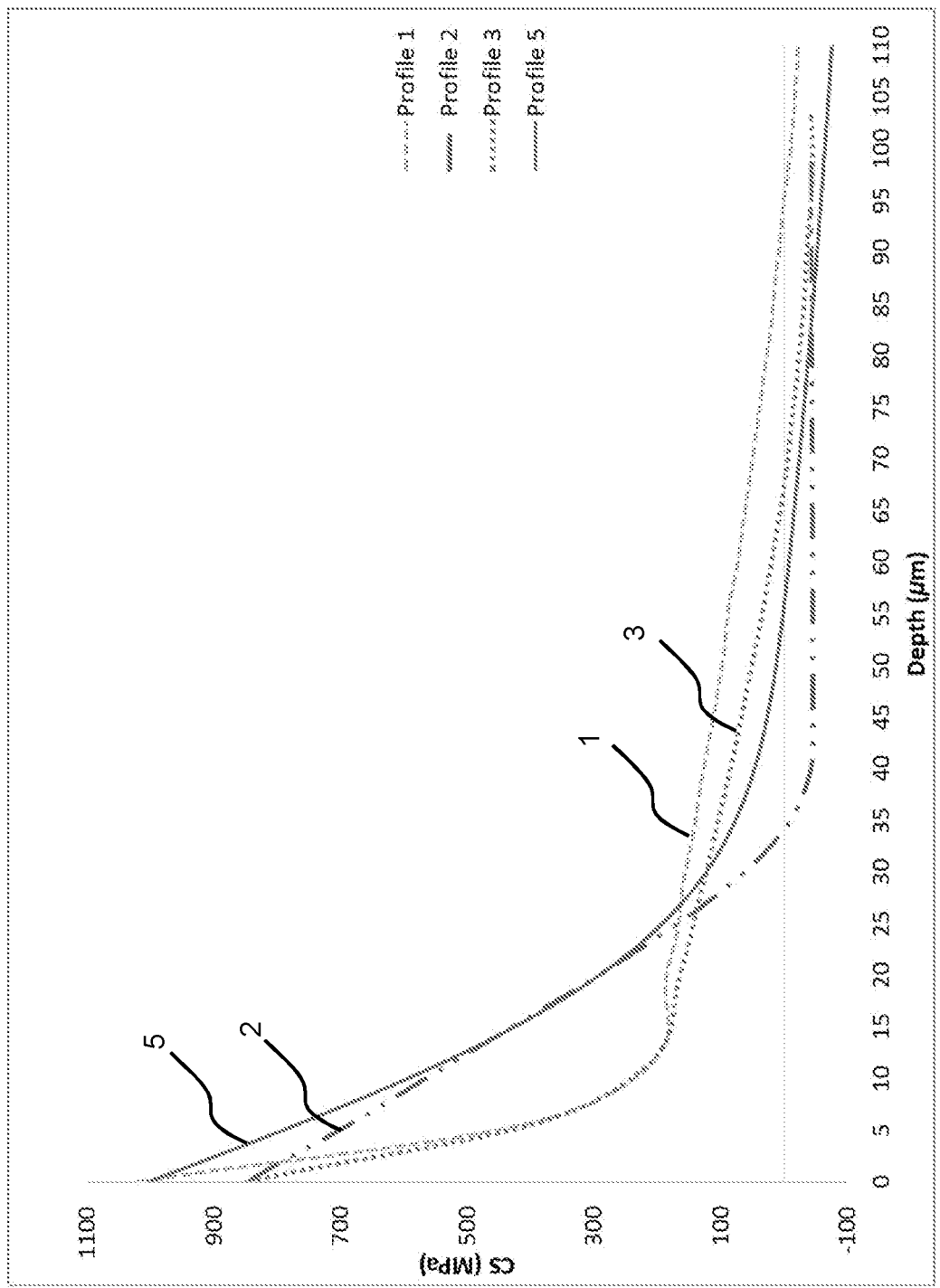
FIG. 4A illustrates stress profiles of glass-based substrates.
Figure 4B:
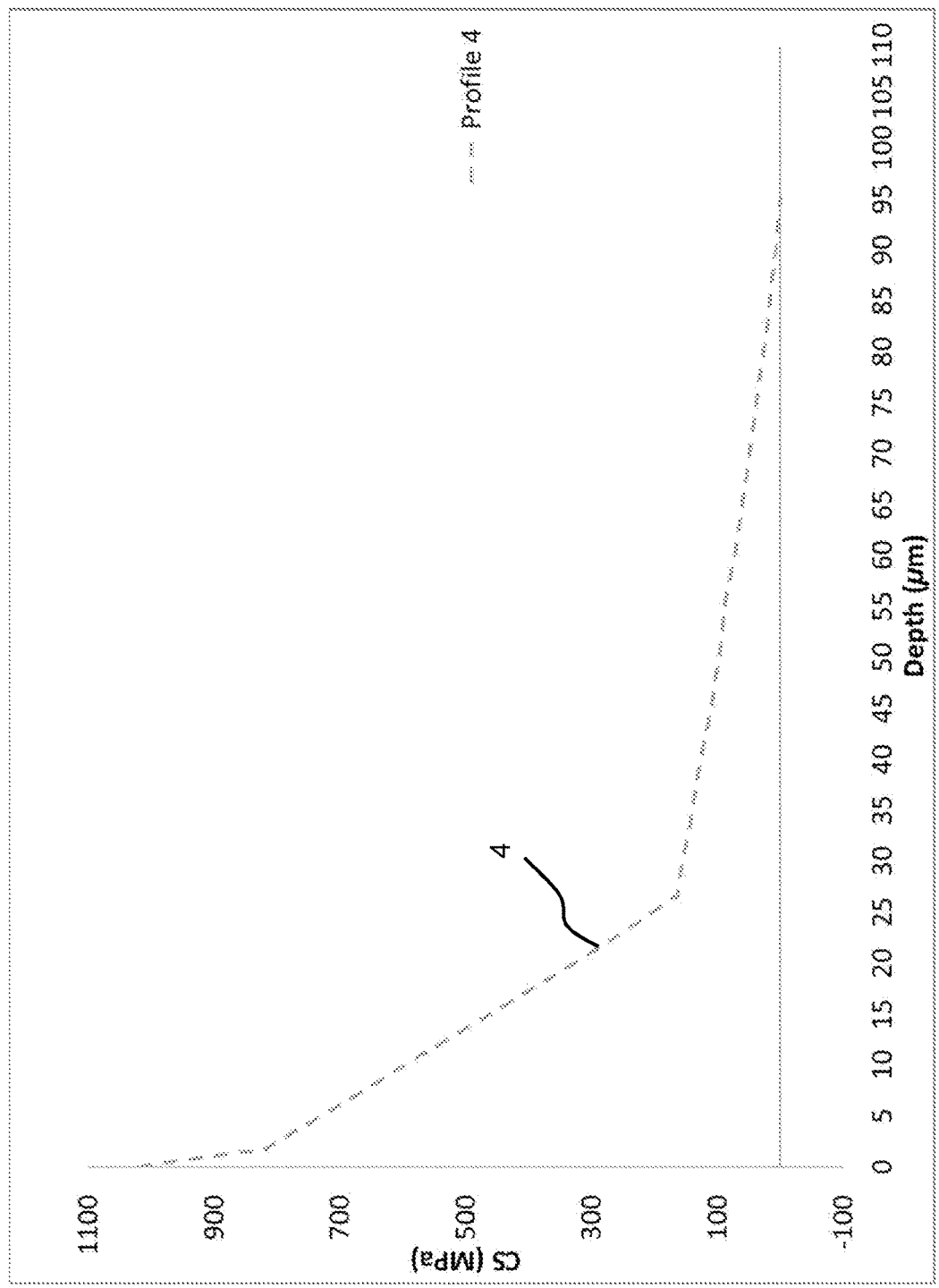
FIG. 4B illustrates a modeled stress profile based on profile 1 and profile 2 in FIG. 4A.

Consideration of stress profiles of existing glass-based materials revealed that such materials were designed to provide flexural strength and deep damage tolerance (e.g. from contact with a sharp object) for uncoated glass-based articles, such as cover glasses for mobile devices. As such, the stress profiles generally have a high surface compressive stress (CS) spike which decays rapidly, and a deep DOC to provide strength for damage deeper than 30 micrometers, which is aided by a low central tension (CT). Several of such profiles are shown in FIGS. 4A and B, which are plots of compressive stress (CS) (in MPa, on the y-axis) versus depth from the surface of the glass-based article (in microns, on the x-axis). Line 1 is a plot for profile 1, line 2 is a plot for profile 2, line 3 is a plot for profile 3, line 4 is a plot for profile 4, and line 5 is a plot for profile 5. Profiles 1 and 3 have been engineered for both flexural strength and deep damage resistance, while profile 2 is a standard ion exchange profile for a chemically strengthened glass-based substrate. Profile 2 has higher compressive stress at depths from 5 micrometers (μm or microns) to 25 μm, resulting in similar flexural strength, but poor resistance to deep flaws (because of the shallow DOC of about 35 microns, as compared with a DOC of more than 50 microns for profiles 5, 3, and 1) for uncoated glass. Profile 4, shown in FIG. 4B, is a combination of profile 1 having a spike at the surface and deep DOC and profile 2 having higher compressive stress (than profiles 1 and 3) from about 5 to about 25 microns from the surface, for example from about 10 to about 20 microns from the surface, for example up to about 15 microns from the surface. Profile 3 also has a deeper DOC than does profile 2, but also has a surface CS which is the same as profile 2 (and lower than profile 1). Accordingly, profile 3 may not be as advantageous as profile 1, but may be used in some situations to combine with profile 2 to make an enhanced profile. Based on an existing model, the maximum failure strain occurs in the first 10 nm to 30 nm from the surface. Therefore, when considering flexural failure, the difference between profiles 1 and 4 is that profile 4 includes the increased compressive stress from a depth of about 5 microns to a depth of about 25 microns, for example from a depth of about 10 microns to a depth of about 20 microns, for example a depth of about 15 microns. That is, profile 4 still includes a spike in compressive stress at the surface (similar to profile 1), which is beneficial for smooth-surface drop performance, but also includes an enhanced compressive stress deeper into the thickness of the glass-based substrate (similar to profile 2). The enhanced compressive stress up to a first depth accounts for a significant increase in failure strain. When thickness (t) is less than 300 microns, the first depth is up to 0.1·t, for example about 0.1·t, about 0.09·t, about 0.08·t, about 0.07·t, about 0.06·t, or about 0.05·t. When thickness (t) is 300 microns or more, the first depth is from about 10 microns to about 30 microns, for example, about 10 microns, about 12 microns, about 14 microns, about 15 microns, about 16 microns, about 18 microns, about 20 microns, about 22 microns, about 24 microns about 25 microns, about 26 microns, about 28 microns, or about 30 microns, or about 12 microns to about 30 microns, or about 14 microns to about 30 microns, or about 16 microns to about 30 microns, or about 18 microns to about 30 microns, or about 20 microns to about 30 microns, or about 25 microns to about 30 microns, or about 12 to about 28 microns, or about 14 to about 26 microns, or about 16 to about 24 microns, or about 18 to about 22 microns. The combination of the surface spike and higher stress over the first depth, results in a profile well-suited to increase the flexural strength of a composite article including a coating after the coating has failed, as during smooth-surface drop. Further increasing the CS over this region will be effective in composite strength retention. In addition, the deep DOC component of profile 4 (similar to the deep DOC components of profiles 1 and 3) provides resistance to deep damage, as by sharp contact or impact, which also translates to improved rough surface drop performance. Profile 4 can be achieved by combining two or more ion exchange steps at different concentrations and bath temperatures.

Figure 5:
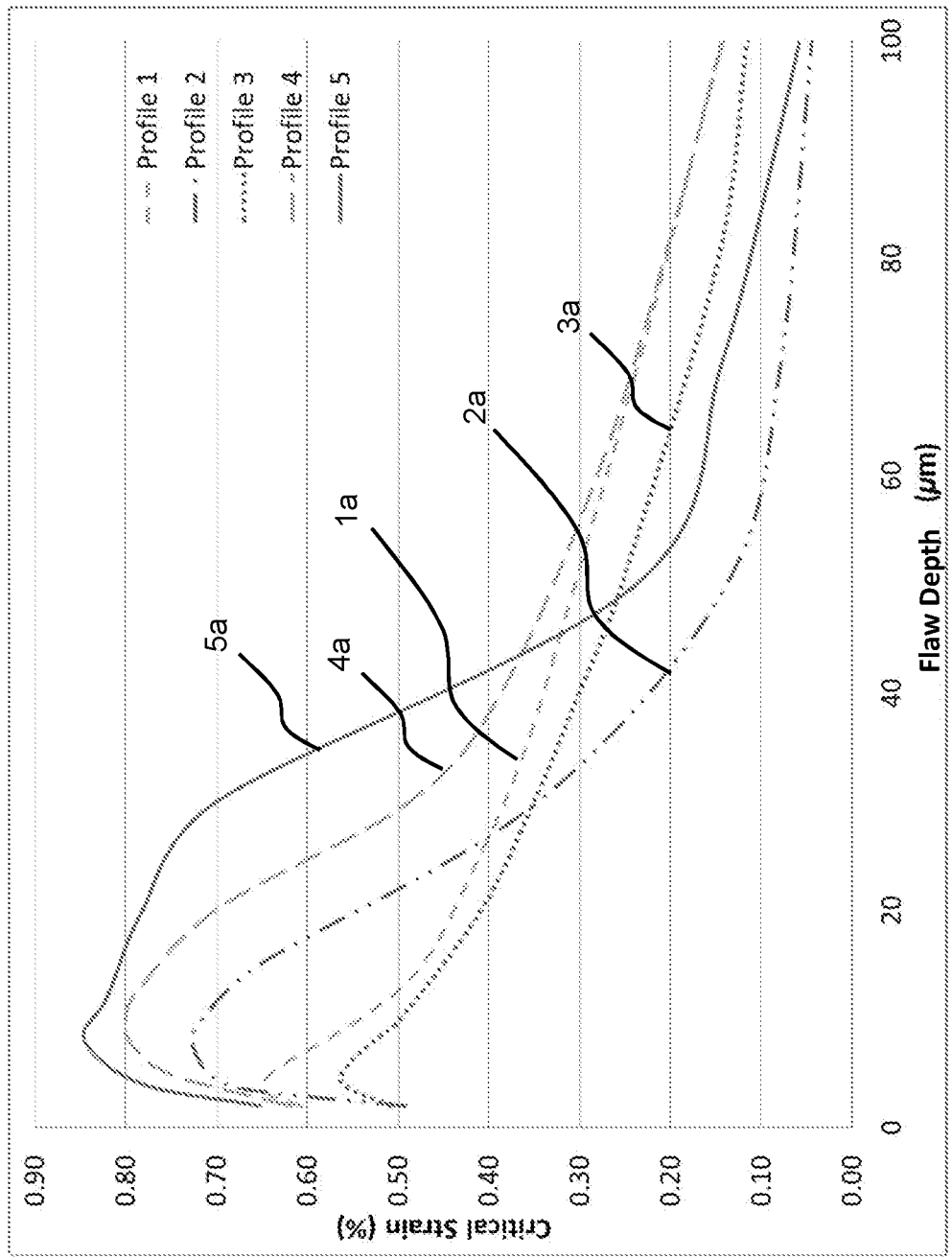
FIG. 5 illustrates a plot critical strain % versus flaw size based on modeling data for the stress profiles shown in FIGS. 4A and 4B.

Profile 5, shown in FIG. 4A, is also a combination of different strengthening mechanisms. Profile 5 can be created by combining the strengthening mechanisms of ion exchange and thermal tempering. Although profile 5 has approximately the same maximum CS at the surface as does profile 4, profile 5 has higher compressive stress than does Profile 4 through the first 5 to 25 micrometers, for example the first 10 to 20 micrometers, for example the first 15 micrometers, from the coating/substrate interface. Thus profile 5 results in further increased flexural strength, as evidenced by the higher critical strain in FIG. 5 and as explained below. In FIG. 5, the critical strain (in %, on the y-axis) is plotted versus flaw depth (in microns, on the x-axis) into the glass-based article. Thus, line 1a is a plot for profile 1, line 2a is a plot for profile 2, line 3a is a plot for profile 3, line 4a is a plot for profile 4, and line 5a is a plot for profile 5.

Fracture mechanics simulations were conducted for coated glass-based articles to predict the critical strain as a function of flaw depth. The resulting critical strain as a function of flaw depth for these profiles is shown in FIG. 5. For all cases, the curves demonstrate an apparent rising R-curve behavior, according to which the critical strain increases with flaw depth, an effect caused by the interaction of high coating tensile stress and the ion exchange compressive stresses for chemically strengthened glass-based substrates. Such apparent rising R-curve behavior makes it more difficult for a crack to grow until it reaches a depth past the maximum critical strain. As a crack grows into the substrate, the influence of the coating diminishes, while the compressive stress from the glass-based substrate influences the critical strain more. Because cracks initiate in the coating and propagate into the glass-based substrate during flexural loading and smooth surface drops, the maximum strain corresponds to the predicted flexural failure strain. Comparing the maximum strains for profiles 2 and 3 (lines 2a and 3a in FIG. 5), profile 2 is predicted to have a higher failure strain, yet profiles 2 and 3 have the same surface CS as shown in FIG. 4A. Similarly, comparing the maximum strains for profiles 4 and 2 (lines 4a and 2a in FIG. 5), profile 4 is predicted to have a higher failure strain and, indeed, profile 4 has a higher CS than does profile 2 as seen from FIGS. 4A and B. Still further, comparing the maximum strains for profiles 5 and 4 (lines 5a and 4a in FIG. 5), profile 5 is predicted to have a higher failure strain, even though profiles 5 and 4 have the same surface CS as seen from FIGS. 4A and B. It follows, then, that the shape of the profile, and not just the maximum stress at the interface, controls the strength (as during flexure, as occurs during drop onto a smooth surface) in a coated glass-based article. This is different from the general concept of emphasizing the surface compressive stress or DOC in strengthened glass-based articles.

As can be seen in FIG. 5, as the maximum critical strain moves to deeper flaw depths, though about the first 10 micrometers of profiles 2, 4, and 5, which will impact the flexural strength and smooth surface drop performance. Profiles designed to increase flexural strength and smooth surface drop performance according to one or more embodiments should target maximum CS in this area, i.e., from a depth of about 5 microns to a depth of about 25 microns from the glass-based substrate surface, for example from a depth of about 10 to a depth of about 20 microns from the substrate surface, for example to a depth of about 15 microns from the substrate surface. Both spikes in surface CS values, and higher CS values at a depth up to from 5 to 25 micrometers from the surface (for example from a depth of about 10 to about 20 microns from the substrate surface, for example to a depth of about 15 microns from the substrate surface) have been shown to improve composite strength retention. And as shown in FIGS. 4A and B, high compressive stress at/near the interface (between the coating and the glass-based substrate, i.e. at the surface of the glass-based substrate) can minimize the strength loss of strengthened glass with brittle functional coatings.

A comparison of profiles 2 and 4 demonstrates the benefit of high surface CS. More specifically, profile 4 has a higher surface CS than does profile 2, and also has a higher critical strain than does profile 2. Accordingly, profile 4 with the higher surface CS will perform better during smooth drop testing and will have better flexural performance. Further, contrasting profiles 1 and 3 with profiles 2, 4 and 5, demonstrates that the high CS over the expected stable critical flaw size range (i.e., from 5 microns to about 25 microns from the surface, for example from a depth of about 10 to a depth of about 20 microns from the substrate surface, for example to a depth of about 15 microns from the substrate surface) is also beneficial in some instances for improved flexural performance. That is, profile 1 has a higher surface CS than does profile 2, but has a lower CS over the range of 5 to 25 microns from the surface. Accordingly, as seen in FIG. 5, even though profile 1 had a higher surface CS than did profile 2, profile 1 had a lower critical strain, and had a maximum critical strain at a depth of less than 10 microns, whereas profile 2 had a maximum critical strain at a depth of about 10 microns. Profile 3 compares with profile 2 in a similar manner as did profile 1. In the case of profile 3, though, the surface CS was the same as that in profile 2. And the higher critical strain evidences a better ability of the profile to prevent cracks from propagating during flexure, as during a smooth surface drop test.

On the other hand, comparing profiles 4 and 5 with profile 2, it is seen that high surface CS is beneficial to flexural strength. That is, profiles 4 and 5 each had a maximum surface CS greater than that of profile 2. Also, profile 4 had a similar CS over a depth of 5 microns to 25 microns as did profile 2, whereas profile 5 had a larger CS over a depth of from about 5 microns to about 15 microns. And as seen in FIG. 5, each of profiles 4 and 5 had a higher critical strain than did profile 2, wherein profile 5 had a higher critical strain than did profile 4. Accordingly, high surface CS, and CS at a depth of 5 to 25 microns from the surface (for example from a depth of about 10 to a depth of about 20 microns from the substrate surface, for example to a depth of about 15 microns from the substrate surface), are both factors in improving critical strain and, accordingly, smooth surface drop performance as well as flexural performance. That is, the higher critical strain evidences a better ability of the profile to prevent cracks from propagating during flexure, as during a smooth surface drop test.

Additionally, profiles 1, 3, 4, and 5 have larger DOC's than does profile 2, resulting in improved performance for resistance to damage from deep flaws, as introduced by sharp impact or contact. Several sets of profiles have been presented, and additional combinations of the presented profiles will likely produce similar results. And a general set of guidelines for profile selection is described herein.

Many coating materials, for example, scratch resistant coatings, have a much higher Young's modulus than glass. For example, many coatings have a Young's modulus from 70 GPa to 225 GPa. Coatings with such high Young's modulus values are also brittle and likely to crack. Because of the modulus mismatch with the glass-based substrate, fracture mechanics indicate that there is a stress intensity singularity at the interface, that is, cracks extending through the coating will propagate some distance into the glass-based substrate. Once cracks propagate into the glass-based substrate, the residual stresses compete with the coating effect described in the previous sentence. The load to propagate a crack from the coating into the glass increases because the cumulative stress on the crack is increasing with increasing crack depth. This phenomenon has been determined experimentally where tests have been interrupted, and coating cracks have been seen terminating in the glass. Accordingly, in one or more embodiments, a high residual stress within a first depth from the surface of the glass-based substrate is provided. When thickness (t) is less than 300 microns, the first depth is up to 0.1·t, for example about 0.1·t, about 0.09·t, about 0.08·t, about 0.07·t, about 0.06·t, or about 0.05·t. When thickness (t) is 300 microns or more, the first depth is from about 10 microns to about 30 microns, for example, about 10 microns, about 12 microns, about 14 microns, about 15 microns, about 16 microns, about 18 microns, about 20 microns, about 22 microns, about 24 microns about 25 microns, about 26 microns, about 28 microns, or about 30 microns, or about 12 microns to about 30 microns, or about 14 microns to about 30 microns, or about 16 microns to about 30 microns, or about 18 microns to about 30 microns, or about 20 microns to about 30 microns, or about 25 microns to about 30 microns, or about 12 to about 28 microns, or about 14 to about 26 microns, or about 16 to about 24 microns, or about 18 to about 22 microns. Once the cracks exceed the peak value (the max strain in FIG. 5), they will fail catastrophically after further loading because the load required to propagate the crack is less than the current load.

When devices having strengthened glass substrates are dropped on rough surfaces, and the contact with the sharp particles introduces damage that extends beyond the DOC (greater than 50 micrometers, for example) of the compressive stress, the article will fail. Thus, the profile should also have a deep DOC to provide resistance to the sharp impact failure modes.

Figure 6:
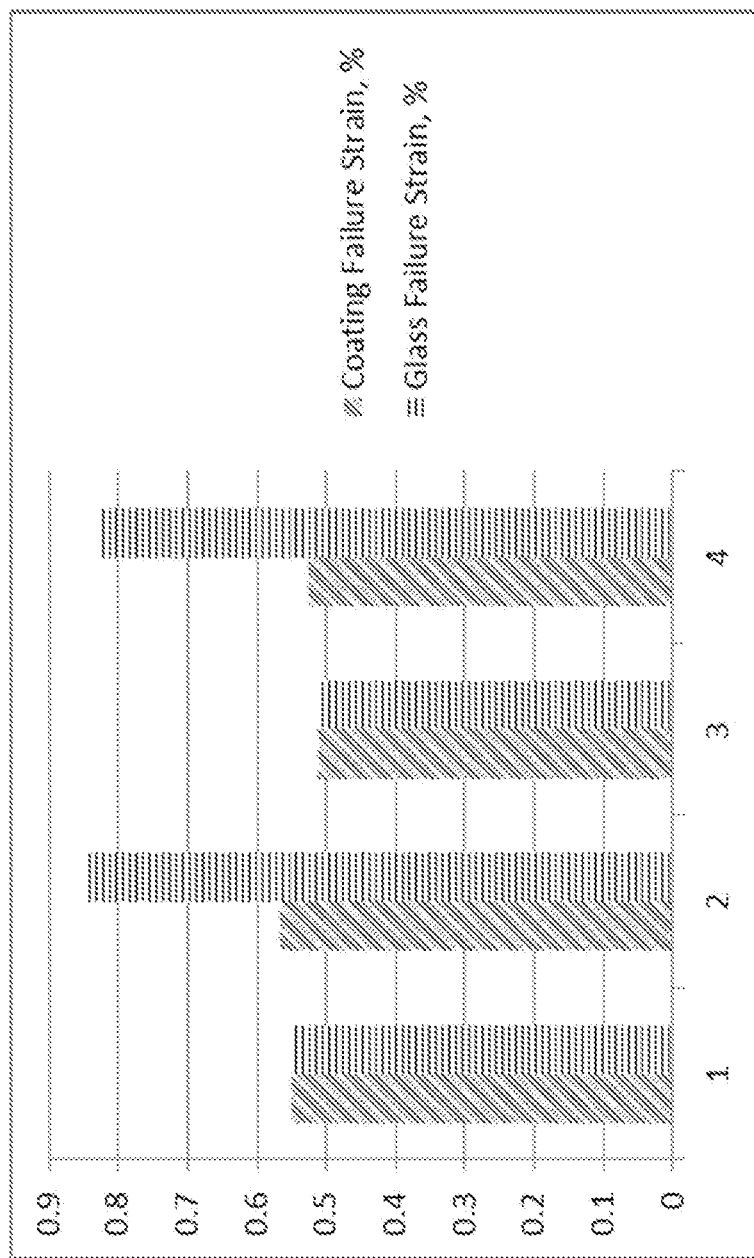
FIG. 6 illustrates failure strain in % for two stress profiles.

FIG. 6 shows a comparison of coating and substrate failure strains for two different stress profiles. The load to failure during ring-on-ring tests was measured for several samples. A finite element simulation of the ring-on-ring test was used to convert the load to failure to a failure strain, as shown in FIG. 6. In FIG. 6, the failure strain (in percent, or %) is shown as a value along the y-axis for four different Examples (1, 2, 3, 4) shown along the x-axis. For each of these examples, the value represented by the bar with diagonal lines represents the coating failure strain, and wherein the bar with the horizontal lines represents the substrate failure strain. Examples 1 and 2 were of the same glass composition, but Example 1 had a stress profile according to Profile 3 above, whereas Example 2 had a stress profile according to Profile 2 above. Similarly, Examples 3 and 4 were of the same composition as one another (but a different composition than that of Examples 1 and 2), wherein Example 3 had a stress profile according to Profile 3 above, and Example 4 had a stress profile according to Profile 2 above. FIG. 6 demonstrates that that the stress profile can impact the failure of a coated substrate. More particularly, FIG. 6 shows that if one compares the slope of the stress profile within the first depth, a shallower slope is better than a steep slope. That is, comparing Examples 1 and 2, which had the same composition: within the first depth, Example 2, having the stress Profile 2 had a tangent with a shallower slope than did Example 1 having the stress Profile 3; the examples had about the same coating failure to strain, albeit Example 2 had a slightly higher value than did Example 1; but Example 2 had a glass failure to strain much higher than that of Example 1. Similarly, comparing Examples 3 and 4, which had the same composition as one another, but a different composition than that of Examples 1 and 2: within the first depth, Example 4, having the stress Profile 2 had a tangent with a shallower slope than did Example 3 having the stress Profile 3; the examples had about the same coating failure to strain, albeit Example 2 had a slightly higher value than did Example 1; but Example 4 had a glass failure to strain much higher than that of Example 3. Accordingly, for smooth surface drop, looking at the stress profile within the first depth, a shallower slope leads to better performance for the glass-based substrate. Further, comparing Examples 1 and 2 (each having the same composition) with Examples 3 and 4 (each having the same composition, but a composition that was different from that of Examples 1 and 2), it is seen that the benefit of a shallower stress profile near the glass surface achieves the benefit of increased failure strain in the glass, even when different glass compositions are used, i.e., the effect is independent of glass composition.

When the same brittle, functional coating (8-layer scratch resistant coating) having a thickness of approximately 2 micrometers was deposited on different ion exchanged glass substrates, a coated, regular ion exchanged composite (for example according to profile 2 in FIG. 4A) substrate demonstrated better strength than a substrate with a deep DOC (for example profiles 1 and 3). Experimental results comparing failure strain for glass substrates with ion exchange profiles 2 and 3 are shown in FIG. 6. FIG. 6 demonstrates that the coating failure occurs at approximately 0.5% to 0.6% strain and is independent of the substrate stress profile. However, the additional CS (of profile 2 as compared with profile 3) at depths up to 5-25 micrometers correlates directly to improved ring-on-ring failure strain and delayed substrate fracture after the onset of coating cracking.

Figure 7:
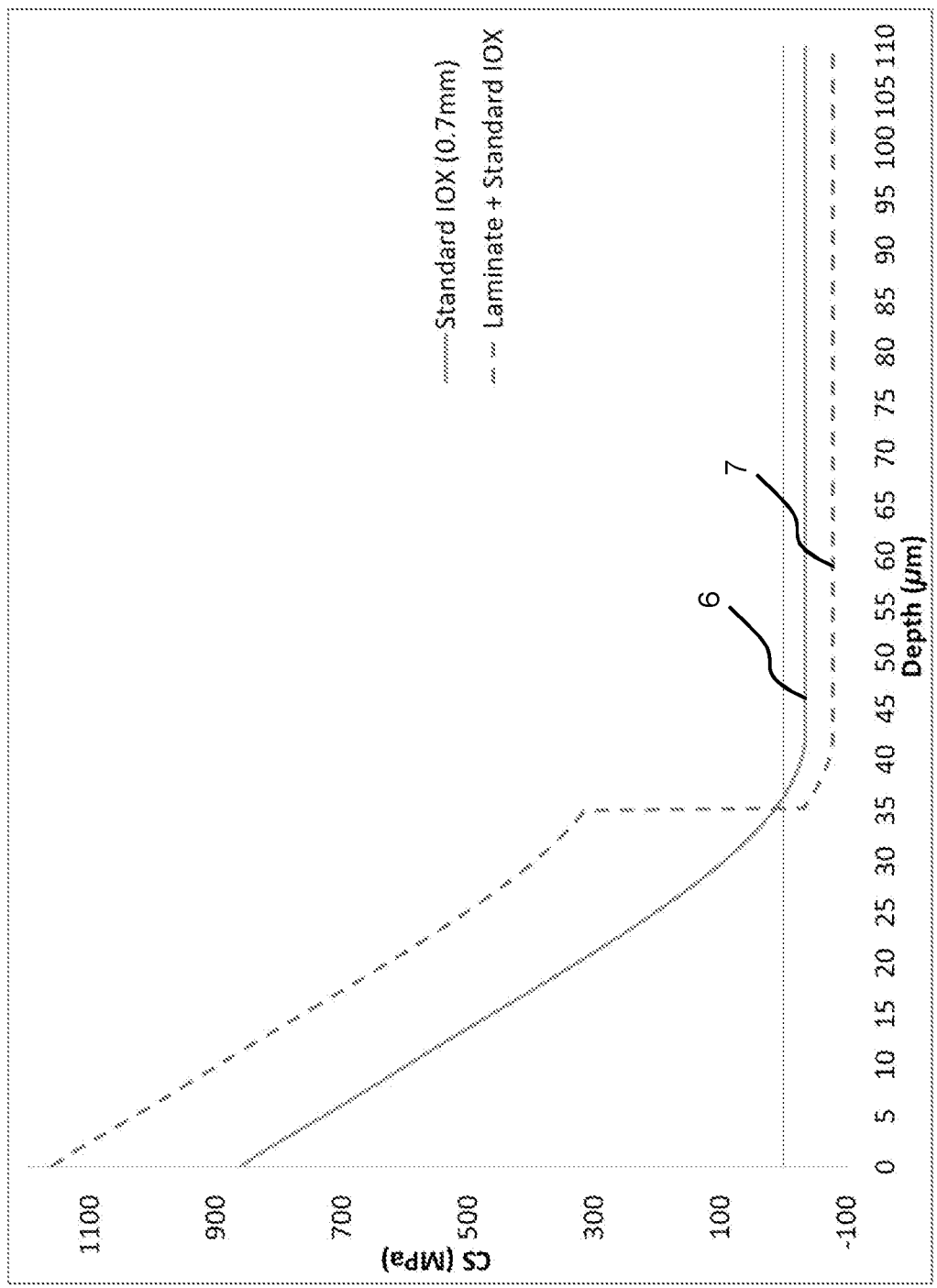
FIG. 7 is illustrates a modeled stress profile compared to a standard ion-exchanged chemically strengthened glass substrate.
Figure 8:
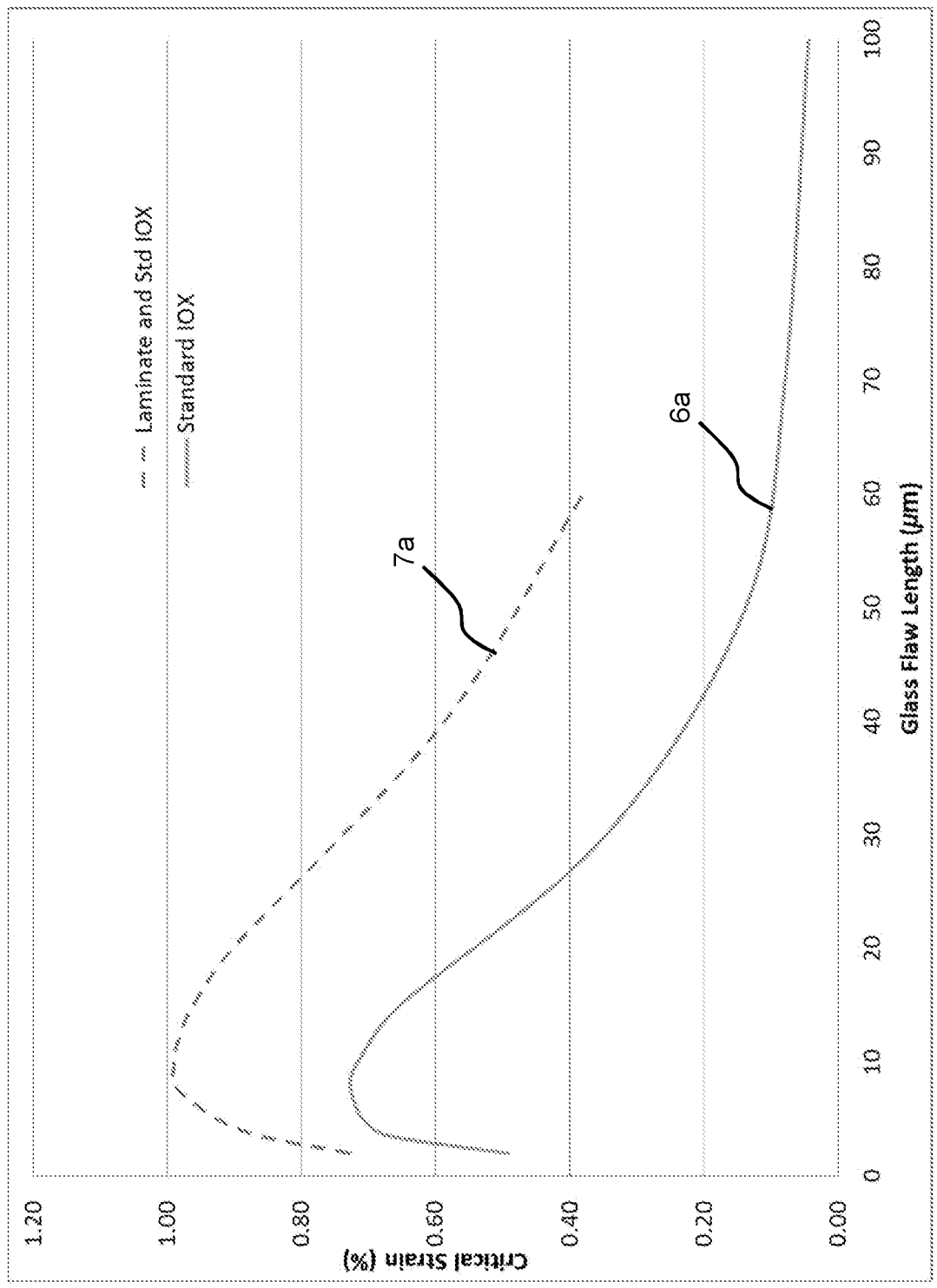
FIG. 8 illustrates critical strain versus glass flaw length for the glasses having the stress profiles shown in FIG. 7.

An additional stress profile is given in FIG. 7, which shows a standard ion exchange profile (solid line 6), and a standard ion exchange profile used together with a laminate profile (dashed line 7), which can be created with a CTE mismatch laminate fusion process. A linear combination of the laminate and ion exchange profiles (line 7) essentially results in an ion exchange profile has been shifted to become more compressive over the length of laminate DOC. As shown in FIG. 7, the laminate DOC is about 35 microns. As shown in FIG. 8, the increased compressive stresses (of the combined laminate and IOX stress profiles, line 7) result in improved flexural performance (line 7a versus line 6a in FIG. 8), improving the maximum critical strain to almost 1.0% (a 30% improvement over the ion exchange profile alone), thus regaining most of the flexural strength of uncoated ion exchanged glass (typically in the range of from 1.2 to 2.0%).

Figure 9:
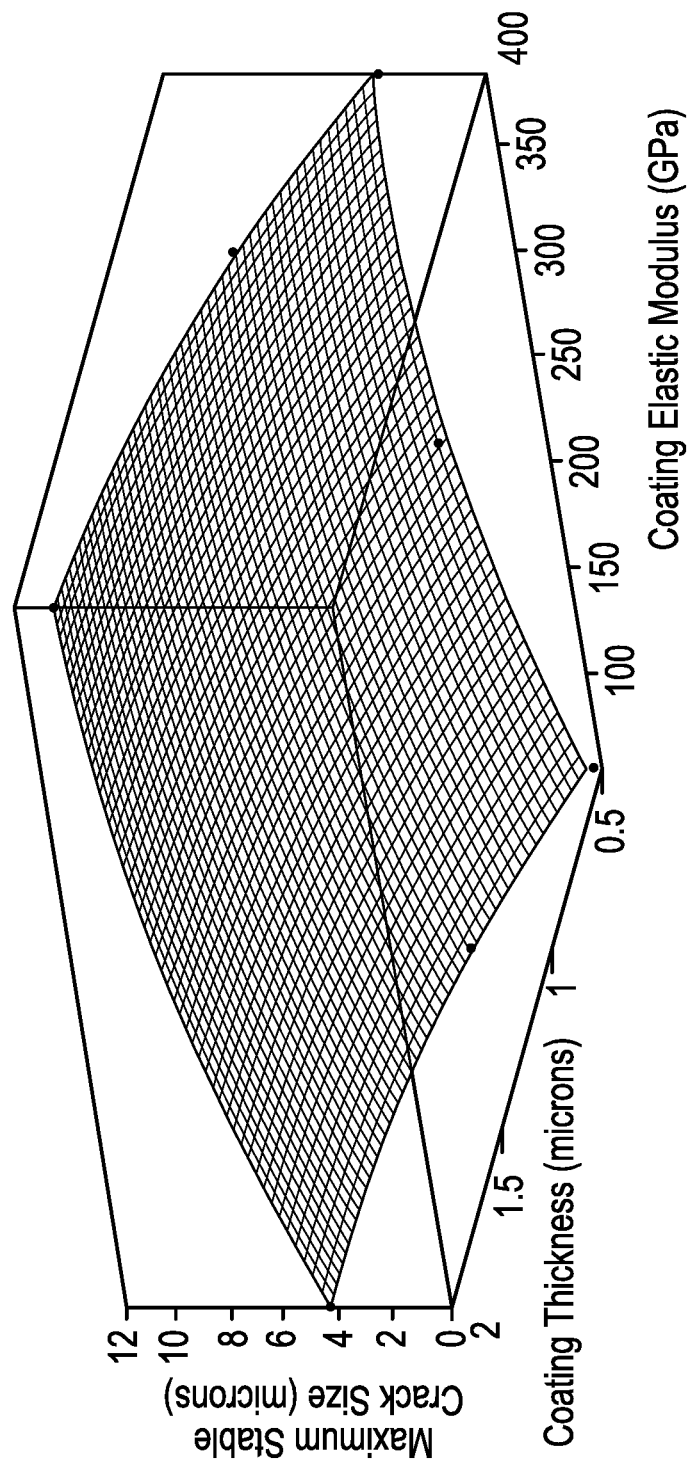
FIG. 9 illustrates a plot of a maximum stable crack size as a function of coating thickness and coating elastic (Young's) modulus.

FIG. 9, which is a plot of a maximum stable crack size as a function of coating thickness and coating elastic (Young's) modulus, shows how these parameters impact flexural strength. The plot shown in FIG. 9 was determined by the following equation:

$$a = 7.088 + 2.106*E_c + 2.474*t_c - 1.019*E_c^2 + 0.4347*t_c*E_c - 0.9236*t_c^2$$

where a is the maximum stable crack size for a glass-based substrate, $E_c$ is the coating modulus, and $t_c$ is the coating thickness. The maximum stable crack size a is not D (as in FIG. 3), but the depth into the compressive stress (CS) profile over which higher CS will improve flexural strength. Beyond this depth, additional CS tends not to improve the flexural strength (within modeling error). However, the point for D may be higher because of constraints of the ion exchange process for chemically strengthened glass-based substrates.

According to one or more embodiments, the increase or decrease in strength on one side of a glass-based substrate can be determined using abraded ring on ring (AROR) testing. The strength of a material is defined as the stress at which fracture occurs. The AROR test is a surface strength measurement for testing flat glass specimens, and ASTM C1499-09(2013), entitled "Standard Test Method for Monotonic Equibiaxial Flexural Strength of Advanced Ceramics at Ambient Temperature," serves as the basis for the AROR test methodology described herein. The contents of ASTM C1499-09 are incorporated herein by reference in their entirety. The glass specimen is abraded prior to ring-on-ring testing with 90 grit silicon carbide (SiC) particles that are delivered to the glass sample using the method and apparatus described in Annex A2, entitled "abrasion Procedures," of ASTM C158-02(2012), entitled "Standard Test Methods for Strength of Glass by Flexure (Determination of Modulus of Rupture). The contents of ASTM C158-02 and the contents of Annex 2 in particular are incorporated herein by reference in their entirety.

Prior to ring-on-ring testing a surface of the glass-based article is abraded as described in ASTM C158-02, Annex 2, to normalize and/or control the surface defect condition of the sample using the apparatus shown in Figure A2.1 of ASTM C158-02. The abrasive material is sandblasted onto the surface 410a of the glass-based article at a load of 104 Kilopascals (kPa) (15 pounds force per square inch (psi)) using an air pressure of 304 kPa (44 psi). After air flow is established, 5 cm$^3$ of abrasive material is dumped into a funnel and the sample is sandblasted for 5 seconds after introduction of the abrasive material.

Figure 10:
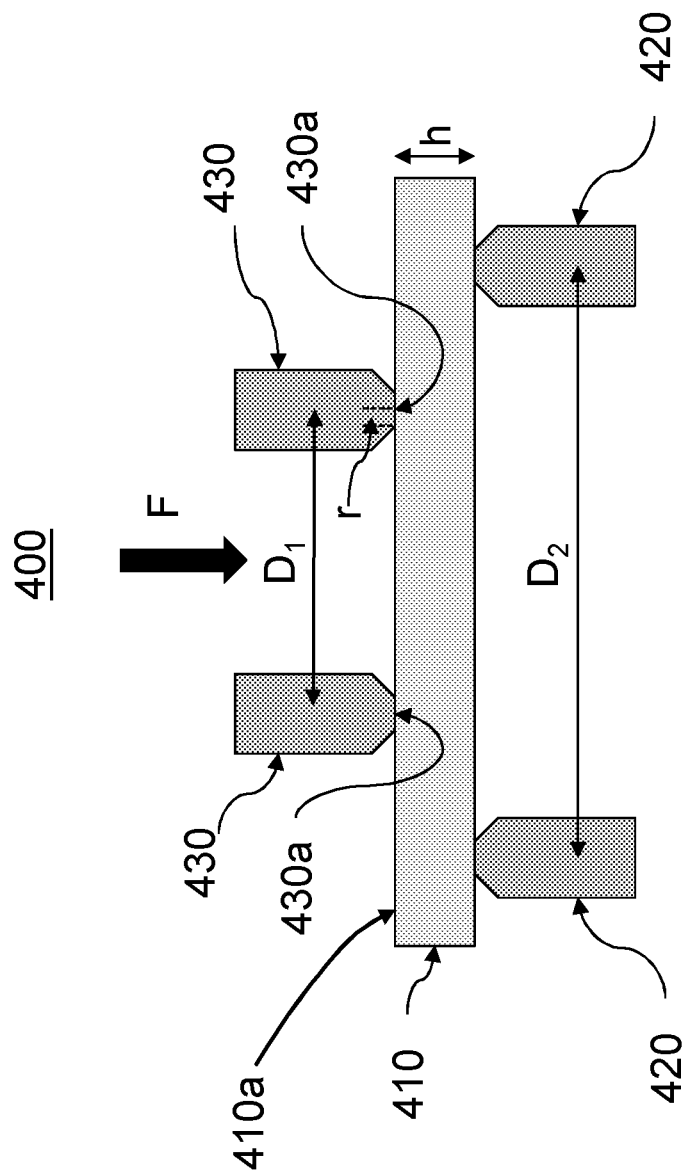
FIG. 10 illustrates a ring on ring testing setup for measuring strength of a substrate.

For the AROR test, a glass-based article having at least one abraded surface 410a as shown in FIG. 10 is placed between two concentric rings of differing size to determine equibiaxial flexural strength (i.e., the maximum stress that a material is capable of sustaining when subjected to flexure between two concentric rings). In the AROR configuration 400, the abraded glass-based article 410 is supported by a support ring 420 having a diameter D2. A force F is applied by a load cell (not shown) to the surface of the glass-based article by a loading ring 430 having a diameter D1.

The ratio of diameters of the loading ring and support ring D1/D2 may be in a range from 0.2 to 0.5. In some embodiments, D1/D2 is 0.5. Loading and support rings 130, 120 should be aligned concentrically to within 0.5% of support ring diameter D2. The load cell used for testing should be accurate to within ±1% at any load within a selected range. Testing is carried out at a temperature of 23±2° C. and a relative humidity of 40±10%.

For fixture design, the radius r of the protruding surface of the loading ring 430 is in a range of h/2≤r≤3h/2, where his the thickness of glass-based article 410. Loading and support rings 430, 420 are made of hardened steel with hardness HRc>40. AROR fixtures are commercially available.

The intended failure mechanism for the AROR test is to observe fracture of the glass-based article 410 originating from the surface 430a within the loading ring 430. Failures that occur outside of this region—i.e., between the loading ring 430 and support ring 420—are omitted from data analysis. Due to the thinness and high strength of the glass-based article 410, however, large deflections that exceed ½ of the specimen thickness h are sometimes observed. It is therefore not uncommon to observe a high percentage of failures originating from underneath the loading ring 430. Stress cannot be accurately calculated without knowledge of stress development both inside and under the ring (collected via strain gauge analysis) and the origin of failure in each specimen. AROR testing therefore focuses on peak load at failure as the measured response.

The strength of glass-based article depends on the presence of surface flaws. However, the likelihood of a flaw of a given size being present cannot be precisely predicted, as the strength of glass is statistical in nature. A probability distribution can therefore be used as a statistical representation of the data obtained.

Glass-based articles described according to one or more embodiments can have a variety of end uses. In one or more embodiments, such glass-based articles include architectural glazings, automotive windshields and glazings. According to one or more embodiments, opposing surfaces of glass-based articles can be designed and tailored to have the desired strength and reliability. Similar considerations apply to architectural glazings used in building construction.

Figure 11B:
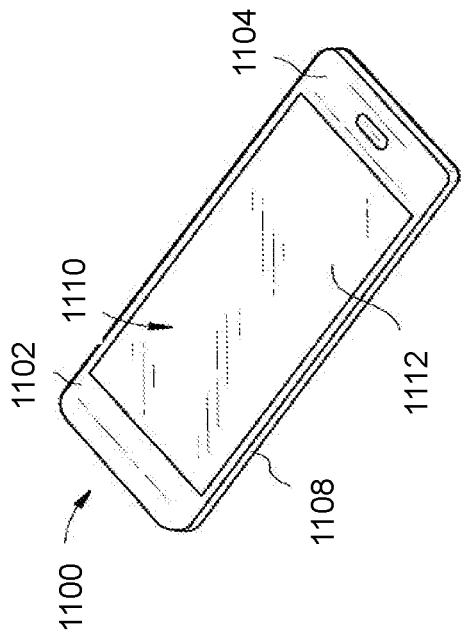
FIG. 11B is a perspective view of the exemplary electronic device of FIG. 11A.
Figure 11A:
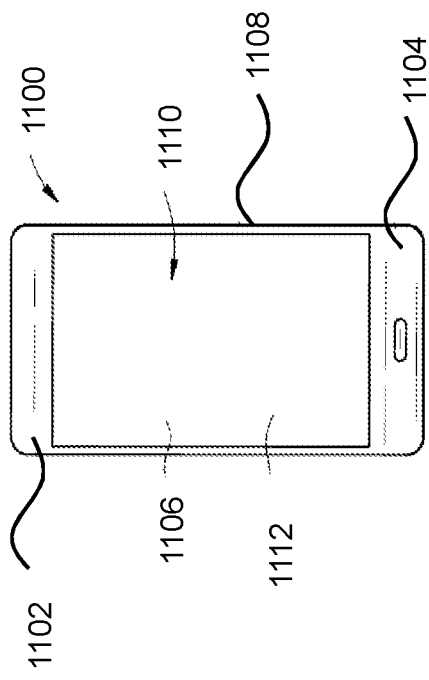
FIG. 11A illustrates a plan view of an exemplary electronic device incorporating any of the strengthened glass-based articles disclosed herein.

The strengthened coated glass-based articles disclosed herein may be incorporated into another article such as an article with a display (or display articles) (e.g., consumer electronics, including mobile phones, tablets, computers, navigation systems, wearable devices (e.g., watches) and the like), architectural articles, transportation articles (e.g., automotive, trains, aircraft, sea craft, etc.), appliance articles, or any article that may benefit from some transparency, scratch-resistance, abrasion resistance or a combination thereof. An exemplary article incorporating any of the strengthened coated glass-based articles disclosed herein is shown in FIGS. 11A and 11B. Specifically, FIGS. 11A and 11B show a consumer electronic device 1100 including a housing 1102 having front 1104, back 1106, and side surfaces 1108; electrical components (not shown) that are at least partially inside or entirely within the housing and including at least a controller, a memory, and a display 1110 at or adjacent to the front surface of the housing; and a cover substrate 1112 at or over the front surface of the housing such that it is over the display. In some embodiments, the cover substrate 1112 may include any of the strengthened coated glass-based articles disclosed herein. In some embodiments, at least one of a portion of the housing or the cover glass comprises the strengthened coated glass-based articles disclosed herein.

According to one or more embodiments, flaw sizes can be determined using fractography as follows. Flaw size is determined using fractography by using ASTM Standard: C1322-15 (Standard Practice for Fractography and Characterization of Fracture Origins in Advanced Ceramics) to determine flaw sizes (origin sizes) for samples broken using four-point bend test (ASTM C1161: Standard Test Method for Flexural Strength of Advanced Ceramics at Ambient Temperature) or ring-on-ring test (ASTM C1499-15). This establishes the flaw size distribution for the glass sheet in the intended application. The more samples that are used for the destructive testing, the better the confidence in the flaw size distribution data from testing. Alternatively, according to one or more embodiments, flaw size can be determined using strength testing and fracture mechanics analysis. In some embodiments, strength data is obtained using as many samples as is feasible using a suitable strength test (four point bend for edge strength and ring-on-ring for interior strength). Using a suitable fracture analysis model (analytical or Finite element analysis), one can estimate the flaw size that caused failure of the sample in the strength test. This assumes a particular flaw size, shape, and location and hence the approach is not as accurate as the fractography approach but it is easier to establish flaw populations.

As used herein, the terms "glass-based article" and "glass-based substrates" are used in their broadest sense to include any object made wholly or partly of glass, glass-ceramic, ceramic, or combinations thereof. Glass-based articles include laminates of glass and non-glass materials, laminates of glass and crystalline materials, and glass-ceramics (including an amorphous phase and a crystalline phase). "Glass-ceramics" include materials produced through controlled crystallization of glass. In embodiments, glass-ceramics have about 30% to about 90% crystallinity. Non-limiting examples of glass ceramic systems that may be used include $Li_2O \times Al_2O_3 \times nSiO2$ (i.e. LAS system), $MgO \times Al_2O_3 \times nSiO2$ (i.e. MAS system), and $ZnO \times Al_2O_3 \times nSiO2$ (i.e. ZAS system). Unless otherwise specified, all compositions are expressed in terms of mole percent (mol %).

Glass substrates according to one or more embodiments can be selected from soda lime glass, alkali aluminosilicate glass, alkali containing borosilicate glass and alkali aluminoborosilicate glass. In one or more embodiments, the substrate is a glass, and the glass can be strengthened, for example, heat strengthened, tempered glass, chemically strengthened glass (for example, strengthened by an ion-exchange process), or glass strengthened by virtue of its laminate structure with layers of glasses having different coefficients of thermal expansion (CTE) so that when formed at an elevated temperature and then cooled impart a compressive stress to the glass having the smaller CTE. Accordingly, to impart a compressive stress on the surface of a glass laminate, the clad glass layer comprises glass with a smaller CTE than that of the core glass. In one or more embodiments, strengthened glass-based substrates have a compressive stress (CS) layer with a CS extending within the chemically strengthened glass from a surface of the chemically strengthened glass to a depth of 10 μm or more and up to several tens of microns deep. In one or more embodiments, the glass-based substrate is a chemically strengthened glass-based substrate such as Corning Gorilla® glass.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, for example, a glass-based article that is "substantially free of MgO" is one in which MgO is not actively added or batched into the glass-based article, but may be present in very small amounts as a contaminant. As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

As used herein, DOC refers to the depth at which the stress within the glass-based article changes from compressive stress to tensile stress. At the DOC, the stress crosses from a compressive stress to a tensile stress and thus exhibits a stress value of zero. According to the convention normally used in the art for stress a negative stress number typically indicates compressive stress and a positive stress value typically indicates tensile stress, i.e., compression is typically expressed as a negative (<0) stress number and tension is typically expressed as a positive (>0) stress number. Throughout this description, however, because stress is a focus, the terms compressive stress (CS) and central tension (CT) are used to differentiate the two types of stresses (compressive and tensile), wherein both numbers are given as positives, i.e., CS and CT numbers are expressed as positive values. Thus, a negative CS number, as shown in certain figures, then indicates tensile stress. Compressive stress (at the surface of the glass) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. DOC may be measured by FSM or a scattered light polariscope (SCALP) depending on the ion exchange treatment. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM.

As used herein, the terms "chemical depth", "chemical depth of layer" and "depth of chemical layer" may be used interchangeably and refer to the depth at which an ion of the metal oxide or alkali metal oxide (e.g., the metal ion or alkali metal ion) diffuses into the glass-based article and the depth at which the concentration of the ion reaches a minimum value, as determined by Electron Probe Micro-Analysis (EPMA) or Glow Discharge-Optival Emission Spectroscopy (GD-OES)). In particular, to assess the depth of $Na_2O$ diffusion or Na+ ion concentration may be determined using EPMA and a surface stress meter (described in more detail below).

In strengthened glass-based substrates, there is a stress profile in which there is a compressive stress (CS) on the surface and tension (central tension, or CT) in the center of the glass. According to one or more embodiments, the glass-based substrate or article can be thermally strengthened, chemically strengthened, a combination of thermally strengthened and chemically strengthened, and/or strengthened by including layers of glass having different CTEs and processing so that the relatively higher CTE glass is used as the core and the article is thermally treated so as to induce compressive stress in the clad glass. As used herein, "thermally strengthened" refers to substrates that are heat treated to improve the strength of the substrate, and "thermally strengthened" includes tempered substrates and heat-strengthened substrates, for example tempered glass and heat-strengthened glass. Tempered glass involves an accelerated cooling process, which creates higher surface compression and/or edge compression in the glass. Factors that impact the degree of surface compression include the air-quench temperature, volume, and other variables that create a surface compression of 68,950 kPa (10,000 psi) or more. Tempered glass is typically four to five times stronger than annealed or untreated glass. Heat-strengthened glass is produced by a slower cooling than tempered glass, which results in a lower compression strength at the surface and heat-strengthened glass is approximately twice as strong as annealed, or untreated, glass.

The strengthened glass-based substrates may be provided using a variety of different processes. For example, exemplary glass-based substrate forming methods include float glass processes, rolling processes, and down-draw processes such as fusion draw and slot draw. A glass-based substrate prepared by a float glass process may be characterized by smooth surfaces and uniform thickness is made by floating molten glass on a bed of molten metal, typically tin. In an example process, molten glass that is fed onto the surface of the molten tin bed forms a floating glass ribbon. As the glass ribbon flows along the tin bath, the temperature is gradually decreased until the glass ribbon solidifies into a solid glass-based substrate that can be lifted from the tin onto rollers. Once off the bath, the glass-based substrate can be cooled further and annealed to reduce internal stress.

Down-draw processes produce glass-based substrates having a uniform thickness that possess relatively pristine surfaces. Because the average flexural strength of the glass-based substrate is controlled by the amount and size of surface flaws, a pristine surface that has had minimal contact has a higher initial strength. When this high strength glass-based substrate is then further strengthened (e.g., chemically), the resultant strength can be higher than that of a glass-based substrate with a surface that has been lapped and polished. Down-drawn glass-based substrates may be drawn to a thickness of less than 2 mm, for example about 1.5 mm, or about 1 mm, or about 750 microns, or about 500 microns, or about 400 microns, or about 300 microns, or about 200 microns, or about 150 microns, or about 125 microns, or about 100 microns, or about 75 microns, or about 50 microns, or about 25 microns. In addition, down drawn glass-based substrates have a very flat, smooth surface that can be used in its final application without costly grinding and polishing.

The fusion draw process, for example, uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass-based substrate. The fusion draw method offers the advantage that, because the two glass films flowing over the channel fuse together, neither of the outside surfaces of the resulting glass-based substrate comes in contact with any part of the apparatus. Thus, the surface properties of the fusion drawn glass-based substrate are not affected by such contact.

The slot draw process is distinct from the fusion draw method. In slow draw processes, the molten raw material glass is provided to a drawing tank. The bottom of the drawing tank has an open slot with a nozzle that extends the length of the slot. The molten glass flows through the slot/nozzle and is drawn downward as a continuous substrate and into an annealing region.

In some embodiments, the compositions used for the glass-based substrate may be batched with 0-2 mol % of at least one fining agent selected from a group that includes $Na_2SO_4$, NaCl, NaF, NaBr, $K_2SO_4$, KCl, KF, KBr, and $SnO_2$.

Once formed, a glass-based substrate may be strengthened to form a strengthened glass-based substrate to provide a strengthened substrate that is coated with a brittle coating. Glass-ceramic substrates may also be strengthened in the same manner as glass-based substrates. As used herein, the term "strengthened substrate" may refer to a glass-based substrate or a glass substrate that has been chemically strengthened, for example through ion-exchange of larger ions for smaller ions in the surface of the glass-based or glass substrate. However, as discussed above, thermal strengthening methods known in the art, such as thermal tempering or heat strengthening, may also be utilized to form strengthened glass substrates. Also, glass-based substrates may be formed as glass-laminates, i.e., form a clad glass and a core glass, each having a different CTE, which are thermally processed to induce compressive stress in the clad glass by virtue of the difference in CTEs of the glasses. In some embodiments, the substrates may be strengthened using a combination of chemical strengthening processes, thermally strengthening processes, and glass-laminate forming processes.

Examples of glasses that may be used in the substrates may include alkali aluminosilicate glass compositions or alkali aluminoborosilicate glass compositions, though other glass compositions are contemplated. Such glass compositions may be characterized as ion exchangeable. As used herein, "ion exchangeable" means that a substrate comprising the composition is capable of exchanging cations located at or near the surface of the substrate with cations of the same valence that are either larger or smaller in size. One example glass composition comprises $SiO_2$, $B_2O_3$ and $Na_2O$, where $(SiO_2+B_2O_3) \geq 66$ mol. %, and $Na_2O \geq 9$ mol. %. Suitable glass compositions, in some embodiments, further comprise at least one of $K_2O$, MgO, and CaO. In some embodiments, the glass compositions used in the substrate can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the substrates comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $(MgO+CaO) \leq 10$ mol. %.

A still further example glass composition suitable for the substrates comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq (MgO+CaO) \leq 7$ mol. %.

In some embodiments, an alkali aluminosilicate glass composition suitable for the substrates comprises alumina, at least one alkali metal and, in some embodiments, greater than 50 mol. % $SiO_2$, in other embodiments 58 mol. % or more $SiO_2$, and in still other embodiments 60 mol. % or more $SiO_2$, wherein the ratio $((Al_2O_3+B_2O_3)/\Sigma$ modifiers$) >1$, where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $((Al_2O_3+B_2O_3)/\Sigma$modifiers$)>1$.

In still other embodiments, the substrates may include an alkali aluminosilicate glass composition comprising: from 64 to 68 mol. % $SiO_2$; from 12 to 16 mol. % $Na_2O$; from 8 to 12 mol. % $Al_2O_3$; from 0 to 3 mol. % $B_2O_3$; from 2 to 5 mol. % $K_2O$; from 4 to 6 mol. % MgO; and from 0 to 5 mol. % CaO, wherein: 66 mol. % $\leq SiO_2+B_2O_3+CaO \leq 69$ mol. %; $Na_2O+K_2O+B_2O_3+MgO+CaO+SrO>10$ mol. %; 5 mol. % $\leq MgO+CaO+SrO \leq 8$ mol. %; $(Na_2O+B_2O_3)-Al_2O_3 \leq 2$ mol. %; 2 mol. % $\leq Na_2O-Al_2O_3 \leq 6$ mol. %; and 4 mol. % $\leq (Na_2O+K_2O)-Al_2O_3 \leq 10$ mol. %.

In some embodiments, the substrates may comprise an alkali aluminosilicate glass composition comprising: 2 mol % or more of $Al_2O_3$ and/or $ZrO_2$, or 4 mol % or more of $Al_2O_3$ and/or $ZrO_2$.

The strengthened substrates described herein may be chemically strengthened by an ion exchange process. In the ion-exchange process, typically by immersion of a glass or glass-ceramic substrate into a molten salt bath for a predetermined period of time, ions at or near the surface(s) of the glass or glass-ceramic substrate are exchanged for larger metal ions from the salt bath. In some embodiments, the temperature of the molten salt bath is 400-430° C. and the predetermined time period is four to twelve hours. The incorporation of the larger ions into the glass or glass-ceramic substrate strengthens the substrate by creating a compressive stress in a near surface region or in regions at and adjacent to the surface(s) of the substrate. A corresponding tensile stress is induced within a central region or regions at a distance from the surface(s) of the substrate to balance the compressive stress. Glass or glass-ceramic substrates utilizing this strengthening process may be described more specifically as chemically-strengthened or ion-exchanged glass or glass-ceramic substrates.

In one example, sodium ions in a strengthened glass or glass-ceramic substrate are replaced by potassium ions from the molten bath, such as a potassium nitrate salt bath, though other alkali metal ions having larger atomic radii, such as rubidium or cesium, can replace smaller alkali metal ions in the glass. According to particular embodiments, smaller alkali metal ions in the glass or glass-ceramic can be replaced by Ag+ ions to provide an antimicrobial effect. Similarly, other alkali metal salts such as, but not limited to, sulfates, phosphates, halides, and the like may be used in the ion exchange process.

In one or more embodiments, the glass-based substrate can have a surface compressive stress of 750 MPa or greater, e.g., 800 MPa or greater, 850 MPa or greater, 900 MPa or greater, 950 MPa or greater, 1000 MPa or greater, 1150 MPa or greater, or 1200 MPa.

Examples of glass compositions are provided above. In specific embodiments, glass compositions disclosed in U.S. Pat. No. 9,156,724 ("the '724 patent") may be used to form glass substrates. The '724 patent discloses alkali aluminosilicate glasses that are resistant to damage due to sharp impact and capable of fast ion exchange. Examples of such alkali aluminosilicate glasses comprise 4 or more mol % $P_2O_5$ and, when ion exchanged, have a Vickers crack initiation threshold of 3 kgf or more, of 4 kgf or more, of 5 kgf or more, of 6 kgf or more, or 7 kgf or more. In one or more specific embodiments, the first strengthened substrate comprises an alkali aluminosilicate glass comprising 4 or more mol % $P_2O_5$ and from 0 mol % to 4 mol % $B_2O_3$, wherein the alkali aluminosilicate glass is substantially free of $Li_2O$ and wherein: $1.3<[P_2O_5+R_2O/M_2O_3]\leq2.3$; where $M_2O_3=Al_2O_3+B_2O_3$, and $R_2O$ is the sum of monovalent cation oxides present in the alkali aluminosilicate glass. In specific embodiments, such alkali aluminosilicate glasses comprise less than 1 mol % $K_2O$, for example 0 mol % $K_2O$. In specific embodiments, such alkali aluminosilicate glasses comprise less than 1 mol % $B_2O_3$, for example 0 mol % $B_2O_3$. In specific embodiments, such alkali aluminosilicate glasses are ion exchanged to a DOC of 10 μm or more, and the alkali aluminosilicate glass has a compressive layer extending from a surface of the glass to the DOC, and wherein the compressive layer includes a compressive stress of 300 MPa or more. In specific embodiments, such alkali aluminosilicate glasses include monovalent and divalent cation oxides are selected from the group consisting of $Na_2O$, $K_2O$, $Rb_2O$, $Cs_2O$, MgO, CaO, SrO, BaO, and ZnO. In highly specific embodiments, such alkali aluminosilicate glasses comprise from 40 mol % to 70 mol % $SiO_2$; from 11 mol % to 25 mol % $Al_2O_3$; from 4 mol % to 15 mol % $P_2O_5$; and from 13 mol % to 25 mol % $Na_2O$. Glass substrates made from the glass composition described immediately above can be ion-exchanged to provide the profile described and claimed herein.

In one or more embodiments, glass compositions described in United States Patent Application Publication No. 20150239775 may be utilized to manufacture glass substrates that can be coated to provided coated glass-based articles as described herein. United States Patent Application Publication No. 20150239775 describes glass articles having a compressive stress profile including two linear portions: the first portion extending from the surface to a relatively shallow depth and having a steep slope; and a second portion extending from the shallow depth to the DOC, the second portion having a shallower slope to achieve a deep DOC.

Ion exchange processes are typically carried out by immersing a glass-based article in a molten salt bath containing the larger ions to be exchanged with the smaller ions in the glass. It will be appreciated by those skilled in the art that parameters for the ion exchange process, including, but not limited to, bath composition and temperature, immersion time, the number of immersions of the glass in a salt bath (or baths), use of multiple salt baths, and additional steps such as annealing, washing, and the like, are generally determined by the composition of the glass and the desired DOC and compressive stress of the glass that result from the strengthening operation. By way of example, ion exchange of alkali metal-containing glasses may be achieved by immersion in at least one molten bath containing a salt such as, but not limited to, nitrates, sulfates, and chlorides of the larger alkali metal ion. The temperature of the molten salt bath typically is from 380° C. to 450° C., while immersion times range from 15 minutes to 40 hours. However, temperatures and immersion times different from those described above may also be used.

In addition, non-limiting examples of ion exchange processes in which glass is immersed in multiple ion exchange baths, with washing and/or annealing steps between immersions, are described in U.S. Pat. No. 8,561,429, by Douglas C. Allan et al., issued on Oct. 22, 2013, entitled "Glass with Compressive Surface for Consumer Applications," and claiming priority from U.S. Provisional Patent Application No. 61/079,995, filed Jul. 11, 2008, in which glass is strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass is strengthened by ion exchange in a first bath is diluted with an effluent ion, followed by immersion in a second bath having a smaller concentration of the effluent ion than the first bath. The contents of U.S. Pat. Nos. 8,561,429 and 8,312,739 are incorporated herein by reference in their entirety.

The compressive stress is created by chemically strengthening the glass-based article, for example, by the ion exchange processes previously described herein, in which a plurality of first metal ions in the outer region of the glass-based article is exchanged with a plurality of second metal ions so that the outer region comprises the plurality of the second metal ions. Each of the first metal ions has a first ionic radius and each of the second alkali metal ions has a second ionic radius. The second ionic radius is greater than the first ionic radius, and the presence of the larger second alkali metal ions in the outer region creates the compressive stress in the outer region.

At least one of the first metal ions and second metal ions are ions of an alkali metal. The first ions may be ions of lithium, sodium, potassium, and rubidium. The second metal ions may be ions of one of sodium, potassium, rubidium, and cesium, with the proviso that the second alkali metal ion has an ionic radius greater than the ionic radius than the first alkali metal ion.

The glass is strengthened in a two-step or dual ion exchange method to produce the compressive stress profile shown in FIG. 3. The first step of the process, the glass is ion exchanged in the first molten salt bath described above. After completion of the first ion exchange, the glass is immersed in a second ion exchange bath. The second ion exchange bath is different—i.e., separate from and, in some embodiments, having a different composition—from the first bath. In some embodiments, the second ion exchange bath contains only salts of the larger alkali metal cation, although, in some embodiments small amounts of the smaller alkali metal cation (e.g., wt %; wt %) may be present in the bath. In addition, the immersion time and temperature of the second ion exchange step may differ from those of the first ion exchange step. In some embodiments, the second ion exchange step is carried out at a temperature of 350° C. or more and, in other embodiments, from 380° C. to 450° C. The duration of the second ion exchange step is sufficient to achieve the desired depth D of the shallow segment AB, in some embodiments, may be 30 minutes or less. In other embodiments, the duration of the second ion exchange step is 15 minutes or less and, in some embodiments, in a range from 10 minutes to 60 minutes.

The second ion exchange bath is different than the first ion exchange bath, because the second ion exchange step is directed to delivering a different concentration of the larger cation or, in some embodiments, a different cation altogether, to the alkali aluminosilicate glass-based article than that provided in the first ion exchange step. In one or more embodiments, the second ion exchange bath may comprise 95% or more by weight of a potassium composition that delivers potassium ions to the alkali aluminosilicate glass-based article. In some embodiments, the second ion exchange bath may comprise from 98% to 99.5% by weight of the potassium composition. While it is possible that the second ion exchange bath comprises at least one potassium salt, the second ion exchange bath may, in further embodiments, comprise 0-5% by weight, or 0.5-2.5% by weight of at least one sodium salt, for example, NaNO$_3$. In some embodiments, the potassium salt is KNO$_3$. In further embodiments, the temperature of the second ion exchange step may be 380° C. or greater, for example up to 450° C. In some embodiments, a glass substrate may be exchanged in a first process at 440° C. for 10 hours in a molten salt bath containing 52% NaNO$_3$ and 48% KNO$_3$ by weight. A second ion exchange may then be performed at 390° C. for 30 minutes or more in a molten salt bath containing 1% NaNO$_3$ and 99% KNO$_3$ by weight. Longer ion exchange times in the second step may be used to achieve the stress profiles described herein. The second ion exchange may be conducted for 1 hour or more, for example 2 hours, 3 hours, 4 hours or longer.

Another specific example of an ion exchange process includes a first ion exchange at 450° C. for 8.5 hours in a molten salt bath containing 45% NaNO$_3$ and 55% KNO$_3$ by weight, followed by a second ion exchange at 390° C. for 30 minutes or more in a molten salt bath containing 1% NaNO$_3$ and 99% KNO$_3$ by weight. Longer ion exchange times in the second step may be used to achieve the stress profiles described herein. The second ion exchange may be conducted for 1 hour or more, for example 2 hours, 3 hours, 4 hours or longer.

Still another specific example of an ion exchange process includes a first ion exchange at 440° C. for 8.8 hours in a molten salt bath containing 37% NaNO$_3$ and 63% KNO$_3$ by weight followed by a second ion exchange at 319° C. for greater than 30 minutes in a molten salt bath containing 1% NaNO$_3$ and 99% KNO$_3$ by weight. Longer ion exchange times in the second step may be used to achieve the stress profiles described herein. The second ion exchange may be conducted for 1 hour or more, for example 2 hours, 3 hours, 4 hours or longer.

Still another specific example of an ion exchange process includes a first ion exchange at 440° C. for 11 hours in a molten salt bath containing 37% NaNO$_3$ and 63% KNO$_3$ by weight followed by a second ion exchange at 390° C. for 30 minutes or more in a molten salt bath containing 1% NaNO$_3$ and 99% KNO$_3$ by weight. Longer ion exchange times in the second step may be used to achieve the stress profiles described herein. The second ion exchange may be conducted for 1 hour or more, for example 2 hours, 3 hours, 4 hours or longer.

Other ion exchange processes can be used to provide the desired profiles described herein.

Examples of coatings are provided above. A specific example of a coating is a scratch-resistant coating. The scratch-resistant coating may exhibit a hardness of 8 GPa or greater, as measured by the Berkovich Indenter Hardness Test. The scratch-resistant coating of some embodiments may exhibit a refractive index of 1.7 or greater. The scratch-resistant coating may include one or more of AlN, Si$_3$N$_4$, AlO$_x$N$_y$, SiO$_x$N$_y$, Al$_2$O$_3$, Si$_x$C$_y$, Si$_x$O$_y$C$_z$, ZrO$_2$, TiO$_x$N$_y$, diamond, diamond-like carbon, and Si$_u$Al$_x$O$_x$N$_y$.

In one or more embodiments, the scratch-resistant coating 140 exhibits a hardness in the range from 5 GPa to 30 GPa as measured by the Berkovich Indenter Hardness Test (measured from the major surface of the scratch-resistant coating). In one or more embodiments, the scratch-resistant coating 140 exhibits a hardness in the range from 6 GPa to 30 GPa, from 7 GPa to 30 GPa, from 8 GPa to 30 GPa, from 9 GPa to 30 GPa, from 10 GPa to 30 GPa, from 12 GPa to 30 GPa, from 5 GPa to 28 GPa, from 5 GPa to 26 GPa, from 5 GPa to 24 GPa, from 5 GPa to 22 GPa, from 5 GPa to 20 GPa, from 12 GPa to 25 GPa, from 15 GPa to 25 GPa, from 16 GPa to 24 GPa, from 18 GPa to 22 GPa and all ranges and sub-ranges therebetween. In one or more embodiments, the scratch-resistant coating 140 may exhibit a hardness that is greater than 15 GPa, greater than 20 GPa, or greater than 25 GPa. In one or more embodiments, the scratch-resistant coating exhibits a hardness in the range from 15 GPa to 150 GPa, from 15 GPa to 100 GPa, or from 18 GPa to 100 GPa. These hardness values may be present at indentation depths of 50 nm or greater, or 100 nm or greater (e.g., in the range from 100 nm to 300 nm, from 100 nm to 400 nm, from 100 nm to 500 nm, from 100 nm to 00 nm, from 200 nm to 300 nm, from 200 nm to 400 nm, from 200 nm to 500 nm, or from 200 nm to 600 nm).

The physical thickness of the scratch-resistant coating 140 may be in the range from 1.0 μm to 3 μm. In some embodiments, the physical thickness of the scratch-resistant coating 140 may be in the range from 1.5 μm to 3 μm, from 1.5 μm to 2.8 μm, from 1.5 μm to 2.6 μm, from 1.5 μm to 2.4 μm, from 1.5 μm to 2.2 μm, from 1.5 μm to 2 μm, from 1.6 μm to 3 μm, from 1.7 μm to 3 μm, from 1.8 μm to 3 μm, from 1.9 μm to 3 μm, from 2 μm to 3 μm, from 2.1 μm to 3 μm, from 2.2 μm to 3 μm, from 2.3 μm to 3 μm, and all ranges and sub-ranges therebetween. In some embodiments, the physical thickness of the scratch-resistant coating 140 may be in the range from 0.1 μm to 2.5 μm, or from 0.1 μm to 1.5 μm, or from 0.1 μm to 1.0 μm, or from 0.2 μm to 3.0 μm, or from 0.2 μm to 2.5 μm, or from 0.2 μm to 2.0 μm, or from 0.2 μm to 1.5 μm, or from 0.2 μm to 1.0 μm.

In one or more embodiments, the scratch-resistant coating 140 has a refractive index of 1.6 or greater. In some instances, the refractive index of the scratch-resistant coating 140 may be 1.65 or greater, 1.7 or greater, 1.8 or greater, 1.9 or greater, 2 or greater, or 2.1 or greater (e.g., in the range from 1.8 to 2.1, or from 1.9 to 2.0). The scratch-resistant coating may have a refractive index that is greater than the refractive index of the substrate 110. In specific embodiments, the scratch-resistant coating has a refractive index that is 0.05 index units greater or 0.2 index units greater than the refractive index of the substrate, when measured at a wavelength of 550 nm.

It will be apparent to those skilled in the art that various modifications and variations can be made to the present disclosure without departing from the spirit and scope of the disclosure. Thus, it is intended that the present disclosure cover such modifications and variations provided they come within the scope of the appended claims and their equivalents. For Example, the concepts may be combined according to the following embodiments.

Embodiment 1

A coated glass-based article comprising:
a glass-based substrate comprising a substrate Young's modulus value and a first surface and a second surface opposing the first surface defining a substrate thickness (t) in a range of 0.1 millimeters to 3 millimeters;
a coating on at least one of the first surface and the second surface of the glass-based substrate, the coating comprising a coating Young's modulus value equal to or greater than the substrate Young's modulus value and comprising a coating thickness ($t_c$) from 80 nanometers to 10 micrometers; and
the glass-based substrate comprising a compressive stress region, the compressive stress region comprising a compressive stress (CS) of from 750 MPa up to 1200 MPa at a surface of the glass-based article, the CS decreasing to zero at a depth of compression (DOC), the compressive region comprising a stress profile comprising a first portion and a second portion, the first portion extending from the first surface up to a first depth, the second portion extending from the first depth to the DOC, points in the first portion comprise a tangent with a slope that is less than −15 MPa/micrometers and greater than −60 MPa/micrometers, and points in the second portion comprise a tangent with a slope that is less than or equal to −1 MPa/micrometers and greater than −12 MPa/micrometers, and when the thickness (t) is less than 300 microns, the first depth is up to 0.1·t, and when the thickness (t) is 300 microns or more, the first depth is from about 10 microns to about 30 microns.

Embodiment 2

The coated glass-based article of embodiment 1, wherein the substrate thickness (t) is from 0.2 millimeters to 2 millimeters.

Embodiment 3

The coated glass-based article of embodiment 1, wherein the substrate thickness (t) is from 0.3 millimeters to 1 millimeter.

Embodiment 4

The coated glass-based article of any of embodiments 1-3, wherein the coating thickness ($t_c$) is from 1 micrometer to 10 micrometers.

Embodiment 5

The coated glass-based article of any of embodiments 1-4, wherein the compressive region comprises a compressive stress CS of from 800 MPa to 1150 MPa at the surface.

Embodiment 6

The coated glass-based article of any of embodiments 1-5, points in the first portion comprise a tangent with a slope that is less than −15 MPa/micrometers and that is greater than −45 MPa/micrometers Embodiment 7

The coated glass-based article of any of embodiments 1-6, wherein points in the second portion comprise a tangent with a slope that is less than or equal to −3 MPa/micrometers and greater than −8 MPa/micrometers.

8. The coated glass-based article of any of embodiments 1-7, wherein the substrate Young's modulus value is from 60 GPa to 80 GPa and the coating Young's modulus value is from 70 GPa to 400 GPa.

Embodiment 9

The coated glass-based article of any of embodiments 1-8, wherein the coating Young's modulus value ranges from 100 GPa to 300 GPa.

Embodiment 10

The coated glass-based article of any of embodiments 1-9, wherein the coating comprises a scratch resistant coating selected from $Al_2O_3$, Mn, $AlO_xN_y$, $Si_3N_4$, $SiO_xN_y$, $Si_u$ $Al_vO_xN_y$, diamond, diamond-like carbon, $Si_xC_y$, $Si_xO_yC_z$, $ZrO_2$, $TiO_xN_y$, and combinations thereof.

Embodiment 11

A coated glass-based article comprising:

a glass-based substrate comprising a substrate Young's modulus value and a first surface and a second surface opposing the first surface defining a substrate thickness (t) in a range of 0.1 millimeters to 3 millimeters;

a coating on at least one of the first surface and the second surface of the glass-based substrate, the coating comprising a coating Young's modulus value equal to or greater than the substrate Young's modulus value and comprising a coating thickness ($t_c$) in a range of 80 nanometers and 10 microns; and the glass-based substrate comprising a compressive region comprising a compressive stress CS of 750 MPa or more at a first surface of the glass-based substrate, the compressive region comprising a stress profile comprising a first portion and a second portion, the first portion extending from the first surface up to a first depth, the second portion extending from the first depth to the DOC such that the CS at a depth of 10 micrometers from the first surface is 30% to 50% of the CS at the first surface, and points of the stress profile of the first portion comprise a first portion tangent and points of the stress profile of the second portion comprise a second portion tangent, wherein a ratio of the slope of the first portion tangent to the slope of the second portion tangent is from 1.25 to 60, and when the thickness (t) is less than 300 microns, the first depth is up to 0.1·t, and when the thickness (t) is 300 microns or more, the first depth is from about 10 microns to about 30 microns.

Embodiment 12

The coated glass-based article of embodiment 11, wherein the ratio of the slope of the first portion tangent to the slope of the second portion tangent is from 3 to 20.

Embodiment 13

The coated glass-based article of embodiment 11, wherein the ratio of the slope of the first portion tangent to the slope of the second portion tangent is from 4 to 15.

Embodiment 14

The coated glass-based article of any of embodiments 11-13, wherein the substrate thickness (t) is from 0.2 millimeters to 2 millimeters.

Embodiment 15

The coated glass-based article of any of embodiments 11-13, wherein the substrate thickness (t) is from 0.3 millimeters to 1 millimeter.

Embodiment 16

The coated glass-based article of any of embodiments 11-15, wherein the coating thickness ($t_c$) is from 1 micrometer to 10 micrometers.

Embodiment 17

The coated glass-based article of any of embodiments 11-16, wherein the compressive region comprises a compressive stress CS at the first surface of from 800 MPa to 1150 MPa.

Embodiment 18

The coated glass-based article of any of embodiments 11-17, wherein the substrate Young's modulus value is from 60 GPa to 80 GPa and the coating Young's modulus value is from 70 GPa to 400 GPa.

Embodiment 19

The coated glass-based article of any of embodiments 11-18, wherein the coating Young's modulus value is from 100 GPa to 300 GPa.

Embodiment 20

The coated glass-based article of any of embodiments 11-19, wherein the coating comprises a scratch resistant coating selected from $Al_2O_3$, Mn, $AlO_xN_y$, $Si_3N_4$, $SiO_xN_y$, $Si_uAl_vO_xN_y$, diamond, diamond-like carbon, $Si_xC_y$, $Si_xO_yC_z$, $ZrO_2$, $TiO_xN_y$, and combinations thereof.

Embodiment 21

The coated glass-based article of any of embodiments 1-20, wherein the glass-based substrate comprises a strengthened glass substrate selected from the group consisting of a laminated glass substrate, chemically strengthened glass substrate, a thermally strengthened glass substrate and a combination thereof.

Embodiment 22

The coated glass-based article of any of embodiments 1-20, wherein the glass-based substrate comprises an ion exchangeable alkali aluminosilicate glass composition.

Embodiment 23

The coated glass-based article of embodiment 22, wherein the alkali aluminosilicate glass further comprises up to 10 mol % $Li_2O$.

Embodiment 24

The coated glass-based article of embodiment 22, where the alkali aluminosilicate glass comprises 4 or more mol % $P_2O_5$ and from 0 mol % to 4 mol % $B_2O_3$, wherein $1.3<[(P_2O_5+R_2O)/M_2O_3]\leq2.3$, where $M_2O_3=Al_2O_3+B_2O_3$, and $R_2O$ is the sum of monovalent cation oxides present in the alkali aluminosilicate glass.

Embodiment 25

The coated glass-based article of embodiment 22, wherein the glass consists essentially of from 40 mol % to 70 mol % $SiO_2$; from 11 mol % to 25 mol % $Al_2O_3$; from 4 mol % to 15 mol % $P_2O_5$; from 13 mol % to 25 mol % $Na_2O$; from 13 to 30 mol % $R_xO$, wherein $R_xO$ is the sum of the alkali metal oxides, alkaline earth metal oxides, and transition metal monoxides present in the glass; from 11 to 30 mol % $M_2O_3$, where $M_2O_3=Al_2O_3+B_2O_3$; from 0 mol % to 1 mol % $K_2O$; from 0 mol % to 4 mol % $B_2O_3$, and 3 mol % or less of one or more of $TiO_2$, MnO, $Nb_2O_5$, $MoO_3$, $Ta_2O_5$, $WO_3$, $ZrO_2$, $Y_2O_3$, $La_2O_3$, $HfO_2$, CdO, $SnO_2$, $Fe_2O_3$, $CeO_2$, $As_2O_3$, $Sb_2O_3$, Cl, and Br; and $1.3<[(P_2O_5+R_2O)/M_2O_3]\leq2.3$, where $R_2O$ is the sum of monovalent cation oxides present in the glass.

Embodiment 26

The coated glass-based article of embodiment 25, wherein the glass is substantially free of lithium.

Embodiment 27

The coated glass-based article of any of embodiments 1-26, wherein the glass-based article is selected from the group consisting of an architectural glass substrate, a vehicle glazing, a vehicle interior glass substrate, an appliance glass substrate, a handheld device glass substrate, and a wearable device glass substrate.

Embodiment 28

A consumer electronic product, comprising:
a housing comprising a front surface, a back surface and side surfaces;
electrical components provided at least partially within the housing, the electrical components comprising at least a controller, a memory, and a display, the display being provided at or adjacent the front surface of the housing; and
a cover glass disposed over the display,
wherein at least one of a portion of the housing or the cover glass comprises the coated glass-based article of any one of embodiments 1-27.

What is claimed is:

1. A coated glass-based article comprising:
a glass-based substrate comprising a substrate Young's modulus value and a first surface and a second surface opposing the first surface defining a substrate thickness (t) in a range of 0.1 millimeters to 3 millimeters;
a coating on at least one of the first surface or the second surface of the glass-based substrate, the coating comprising a coating Young's modulus value equal to or greater than the substrate Young's modulus value and comprising a coating thickness ($t_c$) from 80 nanometers to 10 micrometers; and
the glass-based substrate comprising a compressive region, the compressive region comprising a compressive stress (CS) of from 750 MPa to 1200 MPa at a surface of the glass-based article, the CS decreasing to zero at a depth of compression (DOC), the compressive region comprising a stress profile comprising a first portion and a second portion, the first portion extending from the first surface to a first depth, the second portion extending from the first depth to the DOC, points in the first portion comprise a tangent with a slope that is less than −15 MPa/micrometers and greater than −45 MPa/micrometers, and points in the second portion comprise a tangent with a slope that is less than or equal to −1 MPa/micrometers and greater than −12 MPa/micrometers, and the first depth is from about 20 microns to about 30 microns.

2. The coated glass-based article of claim 1, wherein points in the second portion comprise a tangent with a slope that is less than or equal to −3 MPa/micrometers and greater than −8 MPa/micrometers.

3. The coated glass-based article of claim 1, wherein the substrate Young's modulus value is from 60 GPa to 80 GPa and the coating Young's modulus value is from 70 GPa to 400 GPa.

4. The coated glass-based article of claim 1, wherein the coating comprises a scratch resistant coating selected from $Al_2O_3$, AlN, $AlO_xN_y$, $Si_3N_4$, $SiO_xN_y$, $Si_uAl_vO_xN_y$, diamond, diamond-like carbon, $Si_xC_y$, $Si_xO_yC_z$, $ZrO_2$, $TiO_xN_y$, and combinations thereof.

5. The coated glass-based article of claim 1, wherein the glass-based substrate comprises a strengthened glass substrate selected from the group consisting of a laminated glass substrate, chemically strengthened glass substrate, a thermally strengthened glass substrate and a combination thereof.

6. The coated glass-based article of claim 1, wherein the glass-based substrate comprises an ion exchangeable alkali aluminosilicate glass composition.

7. The coated glass-based article of claim 1, wherein the alkali aluminosilicate glass further comprises up to 10 mol % $Li_2O$.

8. The coated glass-based article of claim 1, wherein the glass-based article is selected from the group consisting of an architectural glass substrate, a vehicle glazing, a vehicle interior glass substrate, an appliance glass substrate, a handheld device glass substrate, and a wearable device glass substrate.

9. The coated glass-based article of claim 1, wherein the substrate thickness is in a range from 0.3 millimeters to 1 millimeter.

10. The coated glass-based article of claim 1, wherein the coating thickness is in a range from 1 micrometer to 10 micrometers.

11. The coated glass-based article of claim 1, wherein the coating is disposed on both the first surface and the second surface of the glass-based substrate.

12. A consumer electronic product, comprising:
a housing comprising a front surface, a back surface and side surfaces;
electrical components provided at least partially within the housing, the electrical components comprising at least a controller, a memory, and a display, the display being provided at or adjacent the front surface of the housing; and
a cover glass disposed over the display,
wherein at least one of a portion of the housing or the cover glass comprises the coated glass-based article of claim 1.

13. A coated glass-based article comprising:
a glass-based substrate comprising a substrate Young's modulus value and a first surface and a second surface opposing the first surface defining a substrate thickness (t) in a range of 0.1 millimeters to 3 millimeters;
a coating on at least one of the first surface or the second surface of the glass-based substrate, the coating comprising a coating Young's modulus value equal to or greater than the substrate Young's modulus value and comprising a coating thickness ($t_c$) in a range of 80 nanometers and 10 microns, and the coating comprises a scratch resistant coating comprising $ZrO_2$; and
the glass-based substrate comprising a compressive region comprising a compressive stress CS of 750 MPa or more at a first surface of the glass-based substrate, the compressive region comprising a stress profile comprising a first portion and a second portion, the first portion extending from the first surface to a first depth, the second portion extending from the first depth to the DOC such that the CS at a depth of 10 micrometers from the first surface is 30% to 50% of the CS at the first surface, and points of the stress profile of the first portion comprise a first portion tangent and points of the stress profile of the second portion comprise a second portion tangent, wherein a ratio of the slope of the first portion tangent to the slope of the second portion tangent is from 1.25 to 60, and when the thickness (t) is less than 300 microns, the first depth is from 0.08·t to 0.1·t, and when the thickness (t) is 300 microns or more, the first depth is from about 16 microns to about 30 microns.

14. The coated glass-based article of claim 13, wherein the compressive region comprises a compressive stress CS at the first surface of from 800 MPa to 1150 MPa.

15. The coated glass-based article of claim 13, wherein the substrate Young's modulus value is from 60 GPa to 80 GPa and the coating Young's modulus value is from 70 GPa to 400 GPa.

16. The coated glass-based article of claim 13, wherein the coating thickness is in a range from 1 micrometer to 10 micrometers.

17. The coated glass-based article of claim 13, wherein the substrate thickness is in a range from 0.3 millimeters to 1 millimeter.

18. A consumer electronic product, comprising:
a housing comprising a front surface, a back surface and side surfaces;
electrical components provided at least partially within the housing, the electrical components comprising at least a controller, a memory, and a display, the display being provided at or adjacent the front surface of the housing; and
a cover glass disposed over the display,
wherein at least one of a portion of the housing or the cover glass comprises the coated glass-based article of claim 13.

* * * * *

UNITED STATES PATENT AND TRADEMARK OFFICE
CERTIFICATE OF CORRECTION

PATENT NO. : 11,028,014 B2
APPLICATION NO. : 16/482035
DATED : June 8, 2021
INVENTOR(S) : Harris et al.

Page 1 of 1

It is certified that error appears in the above-identified patent and that said Letters Patent is hereby corrected as shown below:

On the Title Page

On page 2, in Column 2, item (56), Other Publications, Line 2, delete "Expreimental" and insert -- Experimental --, therefor.

On page 2, in Column 2, item (56), Other Publications, Line 3, delete "Cricical" and insert -- Critical --, therefor.

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*